(12) United States Patent
Kowatari et al.

(10) Patent No.: US 7,114,589 B2
(45) Date of Patent: Oct. 3, 2006

(54) CONTROL DEVICE FOR HYBRID FOUR-WHEEL-DRIVE VEHICLE AND HYBRID FOUR-WHEEL-DRIVE VEHICLE

(75) Inventors: Takehiko Kowatari, Kashiwa (JP); Tatsuyuki Yamamoto, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/914,423

(22) Filed: Aug. 10, 2004

(65) Prior Publication Data
US 2005/0211489 A1 Sep. 29, 2005

(30) Foreign Application Priority Data
Mar. 24, 2004 (JP) .............................. 2004-086697

(51) Int. Cl.
*G06F 7/00* (2006.01)

(52) U.S. Cl. ..................... 180/243; 180/197; 701/89

(58) Field of Classification Search ................ 180/242, 180/243, 197; 701/89
See application file for complete search history.

(56) References Cited

U.S. PATENT DOCUMENTS 6,419,040 B1 * 7/2002 Kitano et al. ............... 180/243
6,453,228 B1 * 9/2002 Shimada ....................... 701/89
6,549,840 B1 * 4/2003 Mikami et al. ............... 701/69
6,931,310 B1 * 8/2005 Shimizu et al. .............. 701/31
2003/0098193 A1 * 5/2003 Ohtsu ........................ 180/197

FOREIGN PATENT DOCUMENTS

JP        2001-63392       3/2001

* cited by examiner

*Primary Examiner*—Kevin Hurley
(74) *Attorney, Agent, or Firm*—Antonelli, Terry, Stout and Kraus, LLP.

(57) ABSTRACT

A control device controls a hybrid-four-wheel-driven vehicle wherein one of the front-wheel pair and the rear-wheel pair is an engine-driven-wheel pair which is driven by an engine, and the other pair is an electric-motor-driven-wheel pair which is driven by an electric motor. In the event of slipping of the engine-driven wheels, the system increases the engine output so as to increase the driving force of the electric-motor-driven wheels for increasing the total driving force made up of the engine-driven-wheel driving force and the electric-motor-driven-wheel driving force, thereby improving acceleration performance, unlike conventional techniques. This provides a control device for suppressing deterioration in acceleration performance of the vehicle in a case of slipping of engine-driven wheels during acceleration.

4 Claims, 14 Drawing Sheets

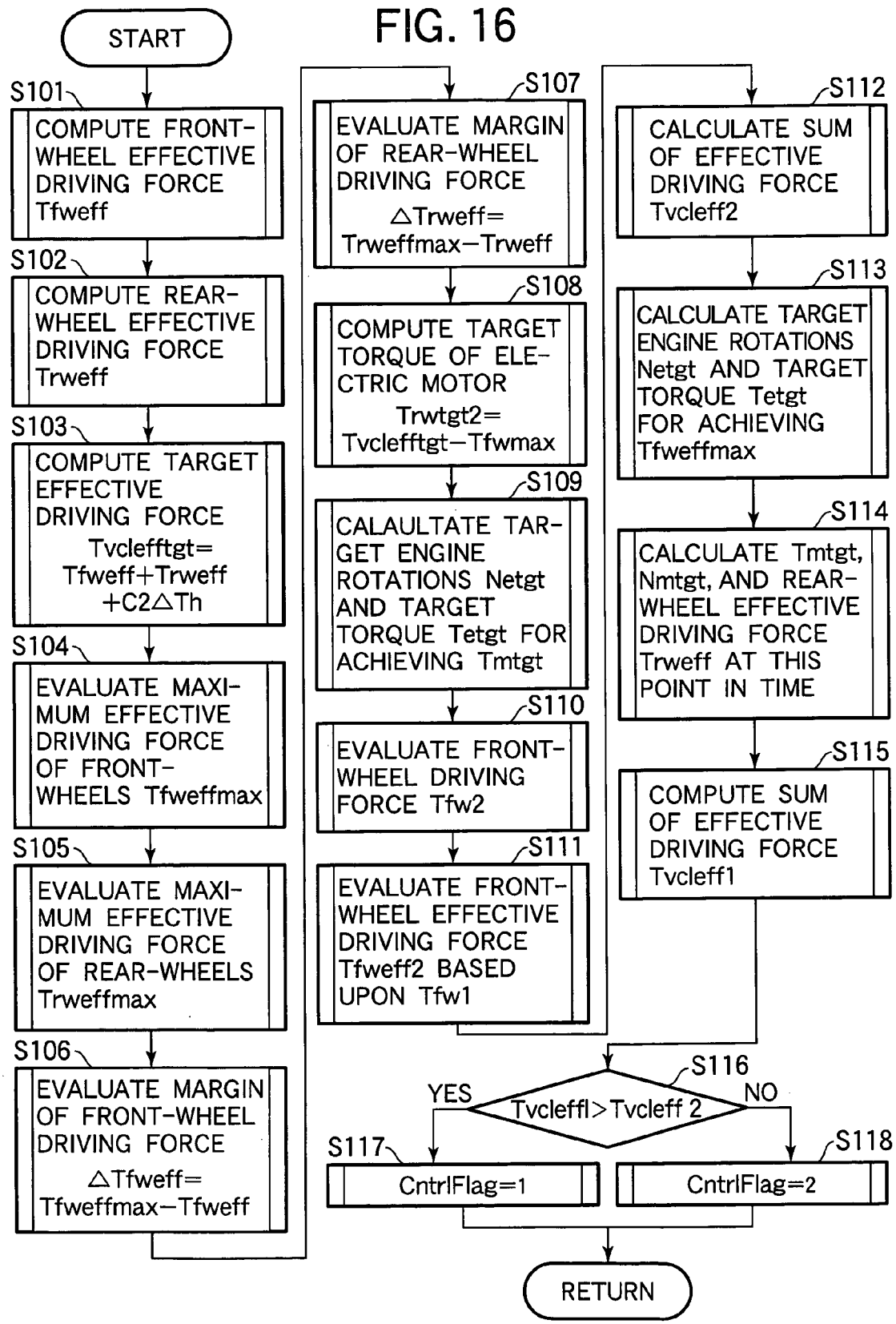

CONTROL DEVICE FOR HYBRID FOUR-WHEEL-DRIVE VEHICLE AND HYBRID FOUR-WHEEL-DRIVE VEHICLE

BACKGROUND OF THE INVENTION

1. Field of the Invention

The present invention relates to a control device for a hybrid four-wheel-drive vehicle wherein the front or rear wheels are driven by an engine, and the others are driven by an electric motor.

2. Description of the Related Art

As an example of hybrid four-wheel-drive vehicles, a hybrid four-wheel-drive vehicle wherein the front wheels are driven by an engine, and the rear wheels are driven by an electric motor is known, as disclosed in Japanese Unexamined Patent Application Publication No. 2001-63392, paragraph 0004, for example (which will be referred to as "Patent Document 1" hereafter). With the four-wheel-drive vehicle disclosed in this Patent Document 1, in the event that the front wheels slip or spin (which will be generically referred to as "slipping" hereafter) during acceleration, the engine drives a generator serving as a power supply for an electric motor for driving the rear wheel. With such a configuration, a part of the engine output is used for driving the generator for supplying electric power to the electric motor, thereby reducing the driving force of the front wheels so as to prevent slipping of the front wheels. Furthermore, even in the event that such operation is insufficient for suppressing slipping of the front wheel, the system reduces the engine output so as to suppress slipping of the front wheels in a sure manner.

However, with the control method disclosed in Patent Document 1, in the event that the engine-driven wheels slip during acceleration, the engine output is reduced so as to suppress slipping, leading to reduced rotational speed of the generator driven by the engine, and reduced torque for driving the generator, resulting in reduced generated electric power. This leads to reduced electric-current supply to the electric motor, resulting in insufficient torque of the electric motor. Furthermore, in the event that the induced voltage of the electric motor exceeds the voltage generated by the generator, the generator cannot supply current to the electric motor, may lead to a problem that the electric motor cannot be driven in such cases. With the aforementioned configuration further including a mechanism wherein an electricity storage device such as a storage battery or the like supplies electric power to the electric motor in such a case, the electric motor generates sufficient torque even in such a case. However, with such a configuration, continuous driving may reduce the electricity stored in the electricity storage device, may lead to a problem that the electric motor cannot be driven in such a case. As described above, the control methods according to the conventional technique have a problem that in the event that the engine-driven wheels slip during acceleration, the electric-motor-driven wheels may not be driven with sufficient driving force, leading to reduction of the acceleration performance of the vehicle.

SUMMARY OF THE INVENTION

It is an object of the present invention to provide a control method for improving the acceleration performance of the vehicle even in a case of the engine-driven wheels slipping during acceleration.

In order to solve the above-described problems, a control device for controlling a hybrid-four-wheel-driven vehicle according to an aspect of the present invention, wherein one of the front-wheel pair and the rear-wheel pair is an engine-driven-wheel pair which is driven by an engine, and the other pair is an electric-motor-driven-wheel pair which is driven by an electric motor connected to a generator driven by the engine, comprises: slipping detecting means for detecting slipping of the engine-driven wheels; and output control means for increasing the output of the engine corresponding to the increased output of the electric motor.

That is to say, the present invention has been made based upon the fact that in a case of slipping of the engine-driven wheels during acceleration, the increased driving force of the electric-motor-driven wheels by increasing engine output increases the total driving force of the engine-driven-wheel driving force and the electric-motor-driven-wheel driving force, unlike conventional techniques. In this case, while slipping of the engine-driven wheels cannot be suppressed, in general, the increase of the effective electric-motor-driven-wheel driving force can be adjusted to be greater than the decrease of the effective engine-driven-wheel driving force. Thus, the present invention improves acceleration performance.

With the above-described control device, the slipping detecting means for the engine-driven wheels may be started at the time of receiving a request for acceleration of the vehicle. The reason is that in general, slipping occurs during acceleration. Note that the slipping detecting means may detect slipping in the event that the rotational speed of the engine-driven wheels exceeds the rotational speed of the electric-motor-driven wheels. Furthermore, the slipping detecting means may detect slipping in the event that the speed of the engine-driven wheels exceeds the driving speed of the vehicle. Furthermore, the slipping detecting means may detect slipping in the event that the slippage, which is the difference in rotational speed between the engine-driven wheels and the electric-motor-driven wheels, divided by the driving speed of the vehicle, is equal to or greater than a predetermined value.

In the above-described configuration, the output control means may further comprise: means for computing the present electric-motor output based upon an input current and a field-coil current of the electric motor; means for computing target acceleration driving force corresponding to an input acceleration request; means for obtaining target electric-motor output based upon the present electric-motor output and the target acceleration driving force; means for obtaining target engine output required for achieving the target electric-motor output; and means for controlling output of the engine and output of the electric motor according to the target engine output and the target electric-motor output.

Furthermore, the output control means may further comprise: effective-driving-force history computation means for obtaining history data of the effective driving force of the electric-motor driving wheels corresponding to the last slippage data for a predetermined past period; and maximum-effective-driving-force computation means for computing the maximum value of the effective driving force of the electric-motor-driven wheels based upon the history data, with the output of the electric motor being increased in a range determined by the maximum value of the effective driving force of the electric-motor-driven wheels.

Furthermore, a control device for controlling a hybrid-four-wheel-driven vehicle according to another aspect of the present invention, wherein one of the front-wheel pair and the rear-wheel pair is engine-driven-wheel pair which is driven by an engine, and the other pair is an electric-motor-driven-wheel pair which is driven by an electric motor, comprises: slipping detecting means for detecting slipping of the engine-driven wheels; first output control means for reducing the output of the engine and reducing the output of the electric motor corresponding to the reduction of engine output when the slipping detecting means detect slipping; second output control means for increasing the output of the electric motor and increasing the output of the engine corresponding to the increase of electric-motor output when the slipping detecting means detect slipping; and switching means for making switching between the first output control means and the second output control means. Note that the first output control means comprise control method according to conventional techniques disclosed in the Patent Document 1, wherein the system gives priority to suppression of excessive slipping of the engine-driven wheels during acceleration.

With such a configuration, the system switches the selected control mode to the second output control means for giving priority to output of the electric motor under conditions such as driving on an icy uphill slope, and accordingly, the driving force of the electric-motor-driven wheels is increased, thereby improving acceleration performance. Subsequently, the system switches the selected control mode back to the first output control means for giving priority to suppression of excessive slipping of the engine-driven wheels, thereby suppressing deterioration in the lifespan of the electric motor due to excessive use thereof, and thereby suppressing deterioration in driving performance of the vehicle.

In this case, the switching means for making switching between the first and second output control means may comprise a switch, and furthermore, switching therebetween may be automatically made. For example, an arrangement may be made wherein the switching means predict total effective driving forces according to the first output control means and the second output control means, each of which include the effective driving force of the engine-driven wheels and the effective driving force of the electric-motor-driven wheels, and the switching means switch the presently-selected output control method to the output control method corresponding to the one of the total effective driving forces predicted to have a greater value. Furthermore, the control device further comprises steering-amount detecting means for detecting the steering amount of the vehicle, and in the event that the steering amount detected by the steering-amount detecting means is equal to or greater than a predetermined value, the switching means select the first control means. With the vehicle having a configuration wherein the steering wheels is driven by the engine controlled according to the second output control means, steering of the engine-driven wheels generates small lateral force of the wheels in a situation wherein acceleration slipping occurs, often leading to a problem of under-steering. Accordingly, an arrangement may be made wherein at the time of steering for turning a corner while making acceleration, the system switches the selected output control means to the first output control means. With such a configuration, the vehicle generates yaw moment more quickly, thereby improving turning-round performance of the vehicle. On the other hand, at the time of driving of the vehicle at a low speed, in many cases, the great yaw moment is not required. Accordingly, an arrangement may be made wherein the system makes forced switching from the second control method to the first control method according to detection of steering in a case of the present vehicle speed exceeding the first vehicle-speed threshold (e.g., 8 km/h). With such a configuration, the vehicle maintains the great rear-wheel driving force at a low speed even in a case of the user steering the vehicle, thereby maintaining acceleration performance of the vehicle.

The present invention thus suppresses deterioration in acceleration performance of the vehicle in a case of slipping of the engine-driven wheels during acceleration.

BRIEF DESCRIPTION OF THE DRAWINGS

FIG. 16 is a flowchart for describing automatic switching processing for making switching between the first and second control methods according to the present invention.

DESCRIPTION OF THE PREFERRED EMBODIMENTS

Description will be made below regarding a hybrid four-wheel-drive vehicle and a control device thereof according to an embodiment of the present invention with reference to the drawings. Note that while description will be made regarding the present embodiment for simplification by way of an arrangement example wherein the vehicle has engine-driven wheels 9 driven by an engine 1, serving as the front wheels, and electric-motor-driven wheels 8 driven by an electric motor 5, serving as the rear wheels, it is needless to say that the present invention may be applied to an arrangement wherein the vehicle has the electric-motor-driven wheels 8 driven by the electric motor 5, serving as the front wheels, and the engine-driven wheels 9 driven by the engine 1, serving as the rear wheels, as well.

Figure 1:
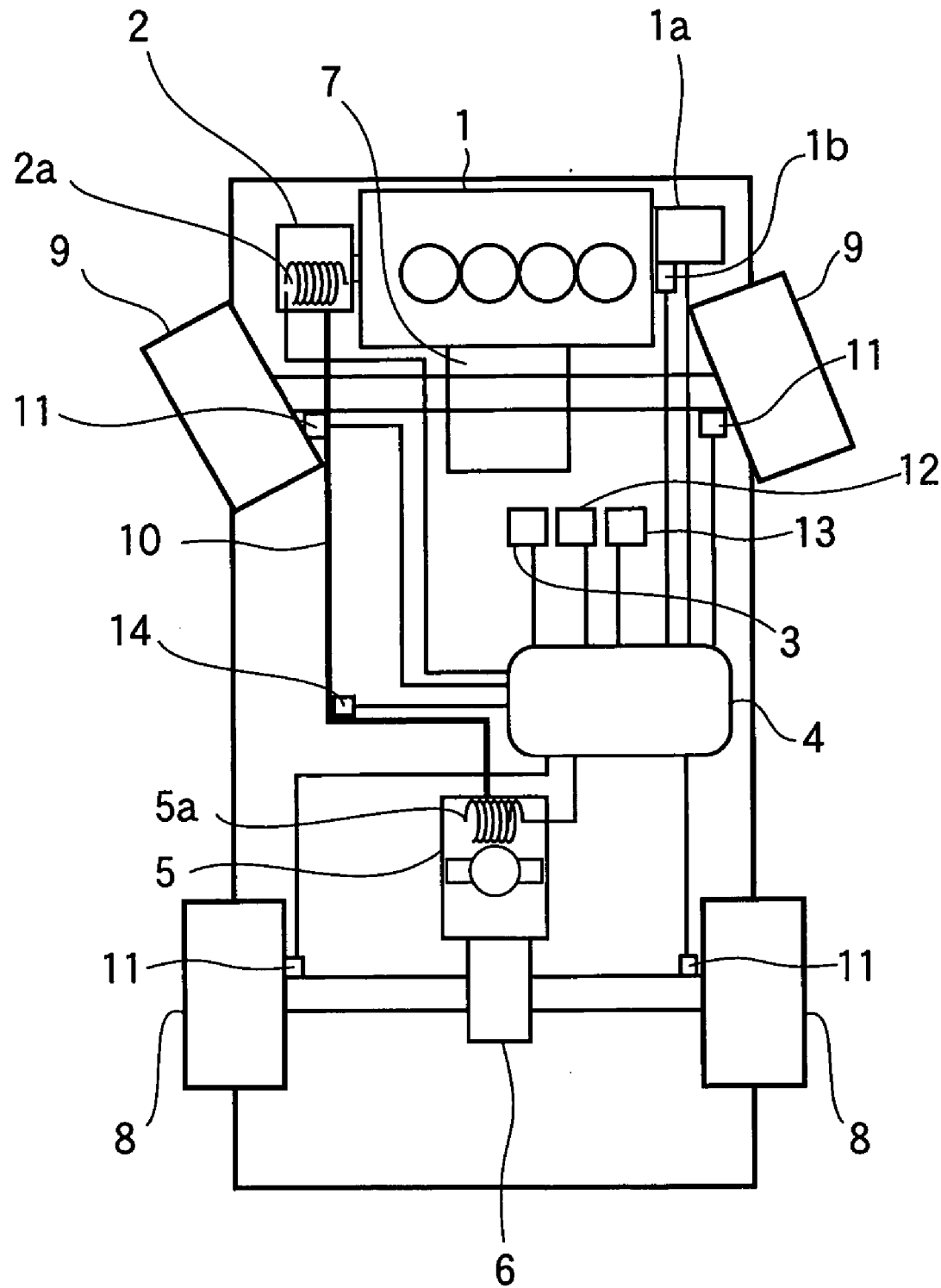
FIG. 1 is an overall configuration diagram which shows a hybrid four-wheel-drive vehicle according to an embodiment of the present invention.

As shown in FIG. 1, a driving device of a hybrid four-wheel-drive vehicle according to the present embodiment includes the engine 1 and the electric motor 5. The output from the engine 1 is transmitted to the engine-driven wheels 9 through a transmission 7 including a torque converter. The output from the electric motor 5 is transmitted to the electric-motor-driven wheels 8 through a differential gear 6 including a clutch. A generator 2 is electrically connected to the electric motor 5 through a power line 10.

The generator 2 is driven by the engine 1 through an unshown accelerating pulley mechanism. In the event that the voltage generated by the generator is less than the voltage supplied from an unshown engine-starting battery, the battery supplies current to a field coil 2a of the generator 2. On the other hand, in the event that the voltage generated by the generator 2 exceeds the battery voltage, a part of the current generated by the generator 2 is supplied to the field coil 2a. With the present embodiment, the electric power generated by the generator 2 is controlled by a controller 4 controlling the current supplied to the field coil 2a with the PWM (Pulse Width Modulation) method. As described above, the generated electric power is controlled by the controller 4 adjusting the field electric current. As a result, the driving force of the electric-motor-driven wheel 8 driven by the electric motor 5 is controlled by the controller 4.

On the other hand, the electric motor 5 is a DC electric motor driven by electric current supplied from the generator 2. The system controls the torque coefficient of the electric motor 5 by adjusting the field current supplied to the field coil 5a. This enables the electric motor 5 to rotate at a high rotational speed, unlike a permanent magnet DC electric motor. With the present embodiment, the controller 4 adjusts the voltage supplied from an unshown battery with the PWM method so as to control the current supplied to the field coil 5a. The output shaft of the electric motor 5 is connected to the electric-motor-driven wheels 8 through the differential gear 6. The current supplied to the electric motor 5 is detected by a current sensor 14 provided at a predetermined portion on the power line 10. As described above, the control device includes the field coil 2a of the generator 2 and the field coil 5a of the electric motor 5 serving as the output control means for the electric motor 5.

On the other hand, with the control device according to the present embodiment, the intake of the engine 1 includes an electronic control throttle 1a for adjusting suction air flow, serving as means for controlling the output of the engine 1. The controller 4 adjusts the electronic control throttle 1a so as to control the output of the engine 1. Furthermore, the controller 4 monitors the engine rotational speed through a rotational speed sensor 1b mounted on the engine 1.

Furthermore, the control device according to the present embodiment includes wheel-speed sensors 11, each of which are mounted on the corresponding wheel, serving as wheel-speed detecting means for detecting the rotational speed of the engine-driven wheels 9 and the electric-motor-driven wheels 8, as well as serving as wheel-speed detecting means for the ABS (Antilock Brake System). The data of the detected rotational speed of each driven wheel is transmitted to the controller 4. Furthermore, the control device according to the present embodiment includes an accelerator-pedal sensor 13 for detecting the stepping amount of the accelerator, serving as acceleration request detecting means for detecting a request for acceleration of the vehicle, and the detected signals are transmitted to the controller 4. Furthermore, the controller 4 receives signals which indicate the state of a switch 12 for selecting a control method from a first control method and a second control method described later in a case of slipping of the engine-driven wheels 9 serving as the front wheels during acceleration.

Figure 2:
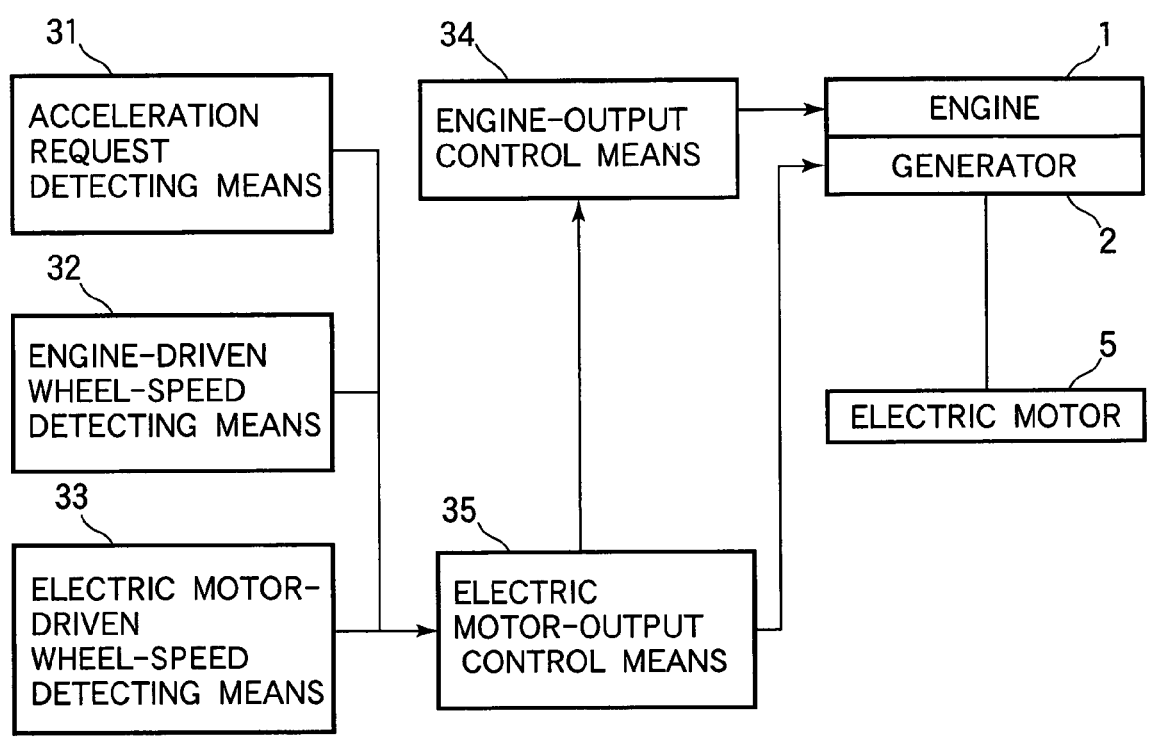
FIG. 2 is a functional configuration diagram which shows a controller according to an embodiment of the present invention.

In FIG. 2, a functional block diagram of a control software configuring the controller 4 is shown. In the drawing, acceleration request detecting means 31 detect the request for acceleration of the vehicle based upon the stepping amount of the accelerator pedal from the user. An engine-driven wheel-speed detecting means 32 detect the speed of the front wheels using the wheel-speed sensors 11 mounted on the front wheels. An electric-motor-driven wheel-speed detecting means 33 detect the speed of the rear wheels using the wheel-speed sensors 11 mounted on the rear wheels. Engine output control means 34 calculate the rotational speed and the torque of the engine, and adjust the electronic control throttle such that the actual rotational speed and the torque thereof match the target ones, whereby the output of the engine is controlled. Electric-motor output control means 35 receive the acceleration request output from the acceleration request detecting means 31, the data of the front wheel speed output from the engine-driven wheel-speed detecting means 32, and the data of the rear wheel speed output from the electric-motor-driven wheel-speed detecting means 33, following which the system determines the target output of the electric motor 5 based upon the aforementioned received information. Then, the electric motor output control means 35 compute the target rotational speed and the target torque of the engine 1, which drives the generator 2, for controlling the electric power generated by the generator 2 such that the actual output of the electric motor matches the target one. Then, the electric motor output control means 35 adjust the field-coil current of the generator 2 so as to control the generated electric power, as well as transmitting the data of the target engine rotational speed and the target engine torque thus obtained to the engine output control means 34.

Figure 3A:
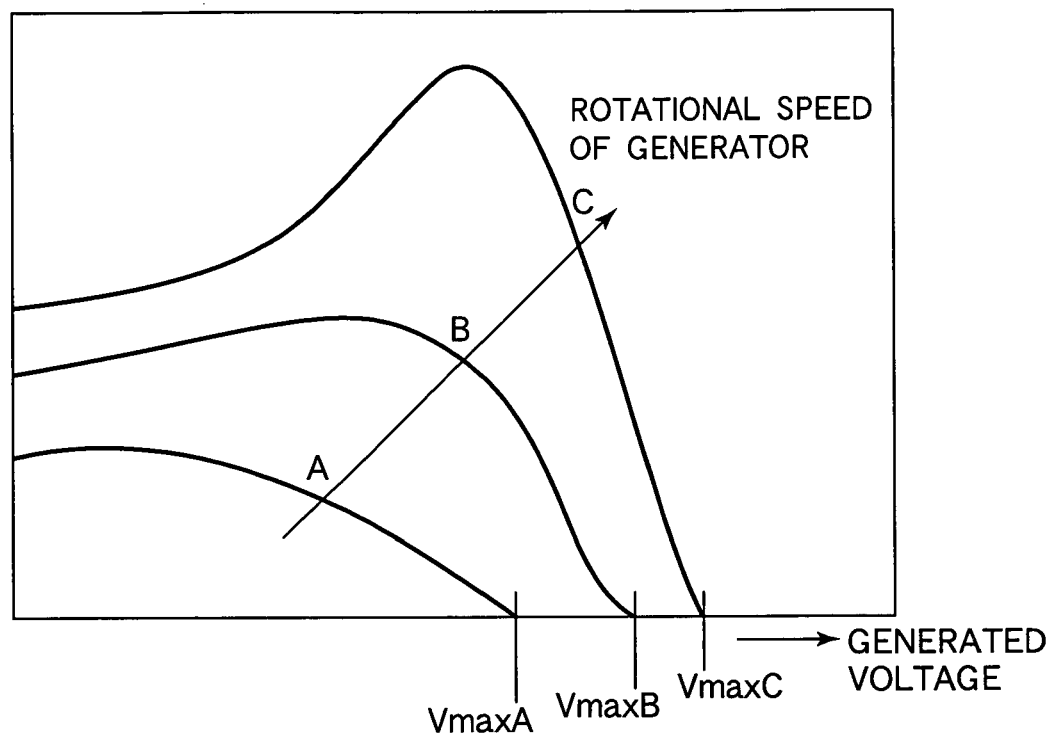
FIGS. 3A and 3B illustrate the relation between the voltage generated by a generator and the torque of the generator, and the relation between the generated voltage and the generated current, with the rotational speed as a parameter.
Figure 3B:
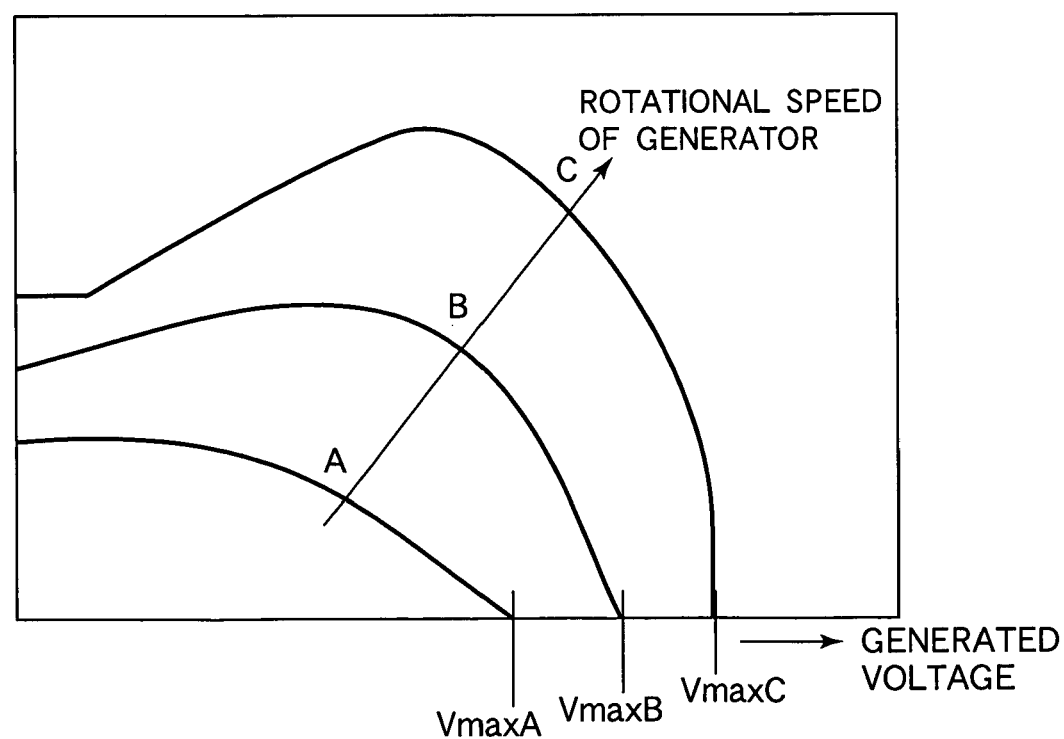

FIGS. 3A and 3B show properties of the generator with the field-coil current of the generator controlled with the PWM ratio of 100% (i.e., with the continuous current mode). FIG. 3A shows the relation between the torque of the generator and the generated voltage, and FIG. 3B shows the relation between the generated current and the generated voltage. Note that these properties are shown with the rotational speed of the generator as a parameter, and the solid lines A, B, and C, represent the properties of the generator with the rotational speed of the generator as a parameter, wherein the rotational speed increases in that order of A, B, and C. As can be understood from the properties represented by the solid lines A, B, and C, the greater the rotational speed is, the greater the generated electric power is, and accordingly, the generator has the property wherein the generated voltage increases in a case of increasing the rotational speed while maintaining the generated current. The term "generated voltage", which is represented by the horizontal axis in FIGS. 3A and 3B, means the voltage applied to the load connected to the generator. With the present embodiment, the power line 14 and the electric motor 5 serve as the load. As can be understood from comparison between the voltage drop due to the power line 14 and that due to the electric motor 5, the voltage drop due to the power line 14 is extremely small. Accordingly, let us consider the voltage drop due to the electric motor 5 alone. The voltage drop due to the electric motor 5 is mainly due to the voltage occurring due to the counter electromotive force of the electric motor 5. Driving of the electric motor 5 generates the counter-electromotive force corresponding to the rotational speed and the torque of the electric motor, leading to the voltage (which will be referred to as "counter-electromotive voltage" hereafter) inverse of the voltage generated by the generator. The following Expression (1) represents the relation between the rotational speed ωmot of the electric motor and the counter-electromotive voltage Eemf occurring due to the counter electromotive force thereof. Here, Ke represents a proportional constant.

$$Eemf = Ke \cdot \omega mot \qquad (1)$$

Figure 4A:
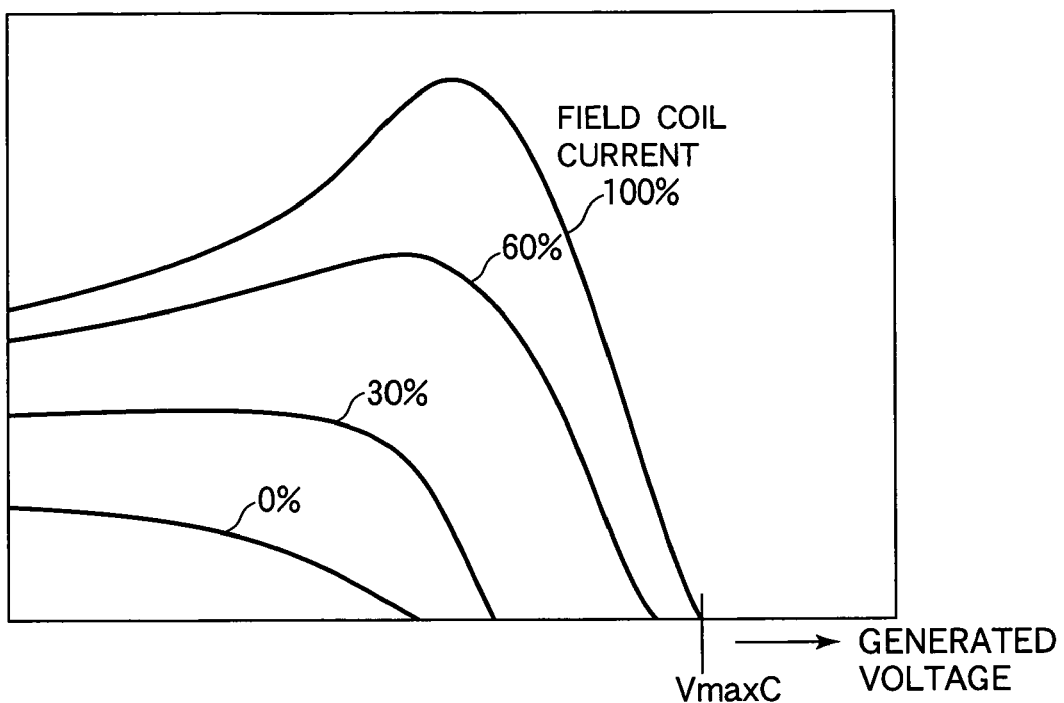
FIGS. 4A and 4B illustrate the relation between the voltage generated by the generator and the torque of the generator, and the relation between the generated voltage and the generated current, with the field-coil current as a parameter.
Figure 4B:
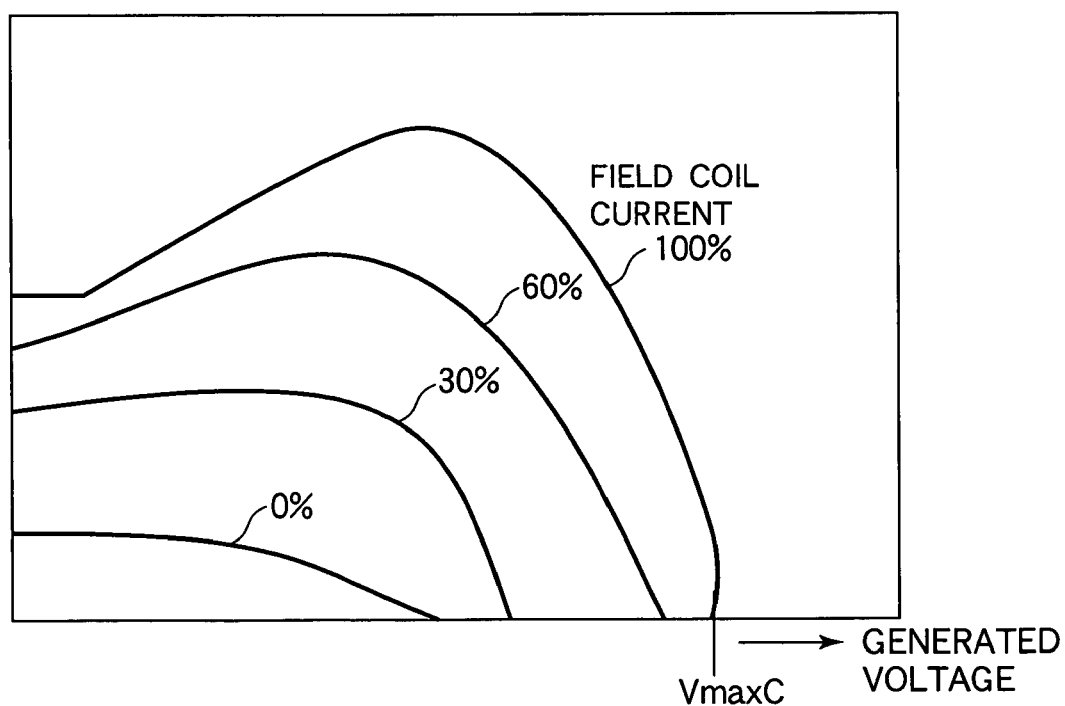

It is needless to say that current is supplied from the generator 2 to the electric motor 5 in the event that the counter-electromotive voltage is less than the voltage generated by the generator. However, in the event that the counter-electromotive voltage becomes the same as the voltage generated by the generator, current is not supplied from the generator 2 to the electric motor 5, leading to output of zero. For example, in a case of driving the generator 2 at the rotational speed B, in the event that the counter-electromotive voltage is equal to or greater than VmaxB (see the solid line B in FIG. 3B), current is not supplied from the generator to the electric motor 5. Accordingly, the generator 2 needs to be driven at a rotational speed increased corresponding to the counter-electromotive voltage increased due to the increased rotational speed of the electric motor 5 for allowing the motor 5 to generate torque. Even in a case wherein current is supplied to the electric motor 5, a large amount of current is required for increasing the torque of the electric motor 5, and accordingly, there is the need to increase the rotational speed of the generator 2. Conversely, in the event that excessive current is generated due to the increased rotational speed of the generator 2, the system can reduce the generated current by reducing the field-coil current of the generator 2. As an example, FIGS. 4A and 4B show properties of electric-power generation with the field-coil current controlled by the controller 4 as a parameter while maintaining the rotational speed of the generator 2 of C. Specifically, these properties are shown with the field-coil current controlled by the controller 4 as a parameter, which is represented by the PWM ratio. Note that the PWM ratio of 100% represents the continuous current mode, and the PWM ratio of 0% represents the current-off mode.

Figure 5:
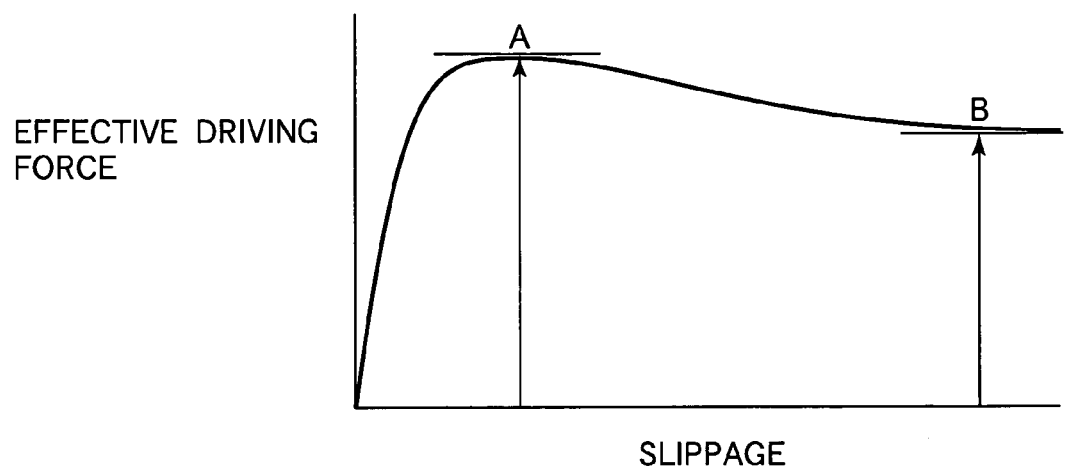
FIG. 5 is a chart for describing the relation between the slippage and the effective driving force.

Detailed description will be made below regarding to a configuration of the control device of the hybrid-four-wheel-drive vehicle according to the present embodiment having such a configuration, as well as regarding the operation thereof. First, let us consider a case wherein the output of the engine 1 is increased so as to accelerate the vehicle on a low friction road such as an icy road. In this case, excessive torque transmitted from the engine 1 causes slipping of the engine-driven wheels 9 serving as the front wheels. The known relation between the slippage and the effective driving force is shown in FIG. 5. In FIG. 5, the horizontal axis represents the slippage, and the vertical axis represents the effective driving force of the driving wheels. Note that the term "slippage" used here means a dimensionless value represented by the following Expression (2), for example. On the other hand, the term "effective driving force" used here means a driving force obtained by subtracting the torque used for acceleration of the driving wheels from the driving force input to the driving wheels, i.e., a driving force which contributes acceleration of the vehicle as to the road.

Slippage=((front-wheel speed)−(rear-wheel speed))/ (vehicle speed)=((driven-wheel speed)−(vehicle speed))/(vehicle speed) (2)

As shown in FIG. 5, this relation has a slippage point (e.g., 5% to 20%) corresponding to the maximum effective driving force. From the aforementioned slippage point, the greater the slippage is, the smaller the effective driving force is while approaching a certain effective driving force which is an asymptotic value denoted by reference character B. Accordingly, in general, the slippage of the front wheels, which are driven by an engine, is preferably reduced to around the peak denoted by reference character A for effectively using the effective driving force for accelerating the vehicle.

Figure 6:
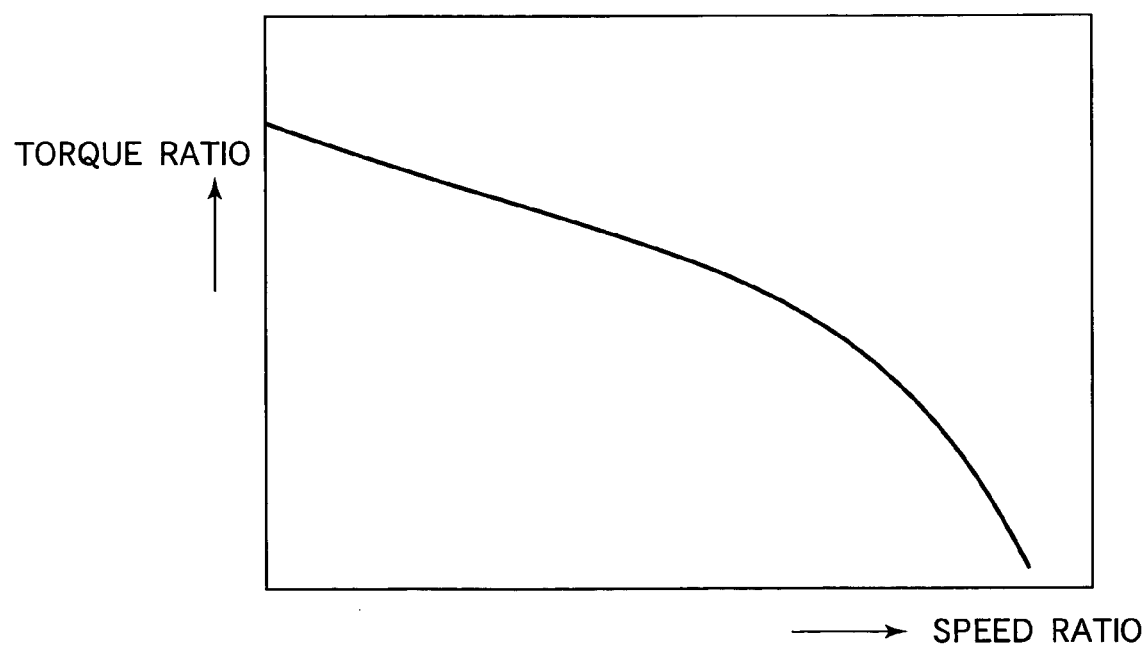
FIG. 6 is a chart which shows the transmission properties of a torque converter.

With the vehicle having a configuration wherein the torque of the engine 1 is transmitted to the front wheels through a torque converter, the system reduces the rotational speed of the engine so as to reduce the driving torque of the wheels for reducing the slippage of the front wheels, giving consideration to the driving-force transmission properties of the torque converter. FIG. 6 shows the properties of the torque converter. In the drawing, the horizontal axis represents the speed ratio of the input/output shafts of the torque converter (=(speed of the output shaft)/(speed of the input shaft)), and the vertical axis represents the torque ratio of the input/output shafts (=(torque of the output shaft)/(torque of the input shaft)). As can be clearly understood from FIG. 6, the smaller the speed ratio is, the greater the torque ratio is. Note that the input shaft is directly connected to the engine, and the output shaft is connected to the wheels through a reduction mechanism. Accordingly, it is effective for reducing the driving torque of the wheels to reduce the engine output so as to reduce the rotational speed thereof.

Figure 7:
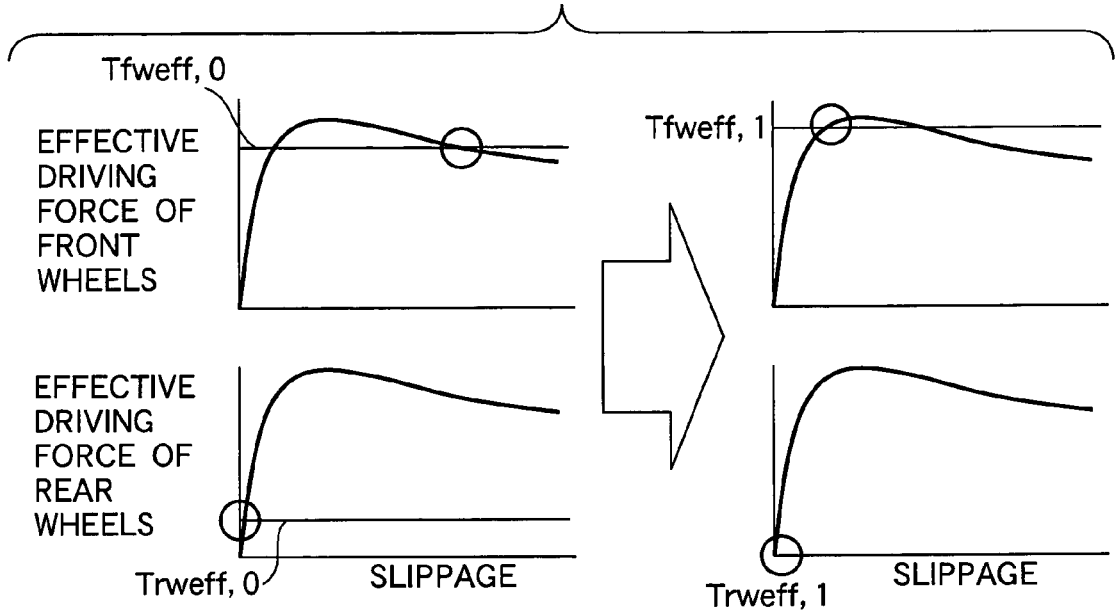
FIG. 7 shows charts for describing the relation between: the slippage of the front and rear wheels; and the effective driving force thereof, before and after control processing with a first control method according to the present invention.

Note that with the hybrid-four-wheel-drive vehicles, in some cases, the operation wherein the slippage of the front wheels is reduced so as to achieve the optimum effective driving force thereof does not maintain the optimum acceleration performance of the vehicle. The reason is that reduction of the rotational speed of the engine 1 leads to reduction of the electric power generated by the generator, resulting in reduced output of the electric motor 5 for driving the rear wheels. Now, description will be made regarding this phenomenon with reference to FIG. 7. FIG. 7 is a diagram for describing the relation between the slippage and the effective driving force for the front wheels and the rear wheels in the initial stage and the stage where the system adjusts the engine output according to a first method of the present invention. The left side in FIG. 7 shows the relation between the effective driving force and the slippage for the front and rear wheels in the initial stage. As can be understood from the operating point denoted by open circle in the drawing, the slippage of the front wheels is great, and the effective driving force thereof is small as compared with the maximum value. On the other hand, the right side in FIG. 7 shows the relation between the slippage and the effective driving force for the front and rear wheels in the stage where the system reduces the output of the engine 1 such that the effective driving force of the front wheels exhibits the maximum value. As can be understood from the operating points denoted by the open circles in the drawing, while the effective driving force of the front wheels increases, the effective driving force of the rear wheels is reduced due to reduction of the output of the electric motor 5. Note that reduction of the effective rear-wheel driving force is greater than the increase of the effective front-wheel driving force. This leads to reduction of the total effective driving force of the vehicle, which is obtained by making the sum of the effective driving forces of the front wheels and the rear wheels.

Figure 8:
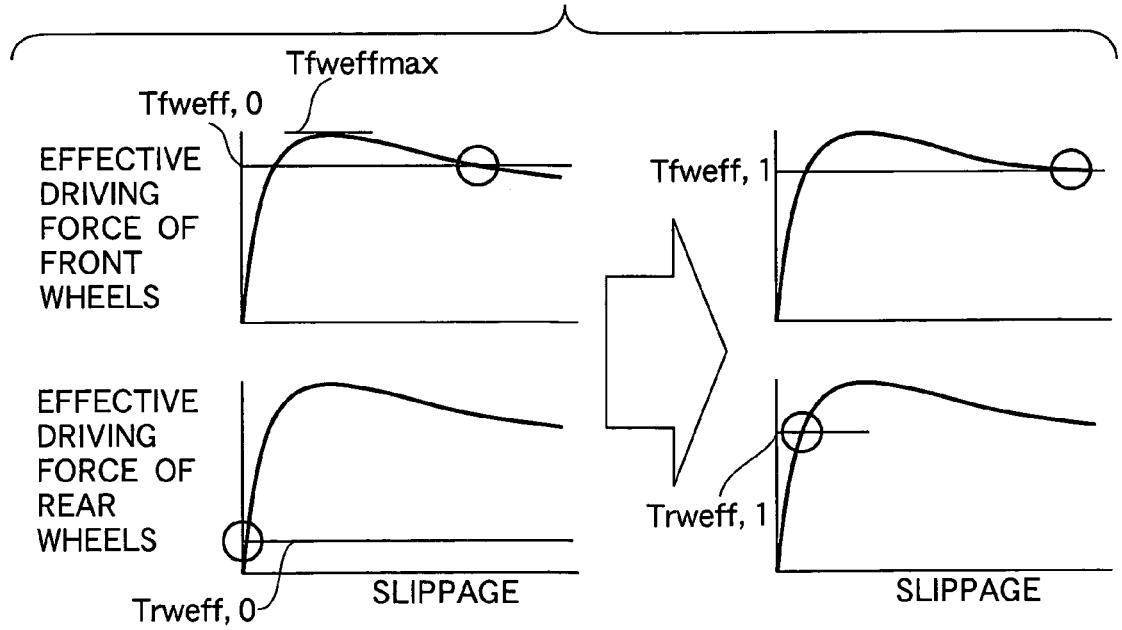
FIG. 8 shows charts for describing the relation between: the slippage of the front and rear wheels; and the effective driving force thereof, before and after control processing with a second control method according to the present invention.

On the other hand, with a second control method according to the present invention, in such an initial stage described above, the system increases the engine output so as to increase the output of the electric motor 5 for increasing the driving force of the rear wheels driven by the electric motor, unlike the first control method described above. In some cases, the second control method achieves the increased total effective driving force of the vehicle, thereby maintaining the optimum acceleration performance thereof, as compared with the first control method. Now, description will be made regarding this phenomenon with reference to FIG. 8. FIG. 8 is a diagram for describing the relation between the slippage and the effective driving force for the front wheels and the rear wheels in the initial stage and the stage where the system adjusts the engine output according to a second method of the present invention. The left side in FIG. 8 shows this relation in the initial stage, wherein the slippage of the front wheels is greater than that of the rear wheels. On the other hand, the right side in FIG. 8 shows this relation in the stage where the system increases the engine output so as to increase the output of the electric motor according to the second control method of the present invention. In this case, while the effective driving force of the front wheels is reduced, the total effective driving force of the vehicle increases since the increase of the effective driving force of the rear wheels is greater than the reduction of the effective driving force of the front wheels, thereby improving the acceleration performance of the vehicle.

Furthermore, in a case of slipping of the engine-driven wheels, the system according to the present embodiment selects a suitable control method corresponding to a situation, from the first control method wherein the system reduces the engine output so as to suppress slipping thereof for accelerating the vehicle, and the second control method wherein the system increases the engine output, unlike the first control method, so as to increase the output of the electric motor for accelerating the vehicle. Specific description thereof will be made below.

Figure 9:
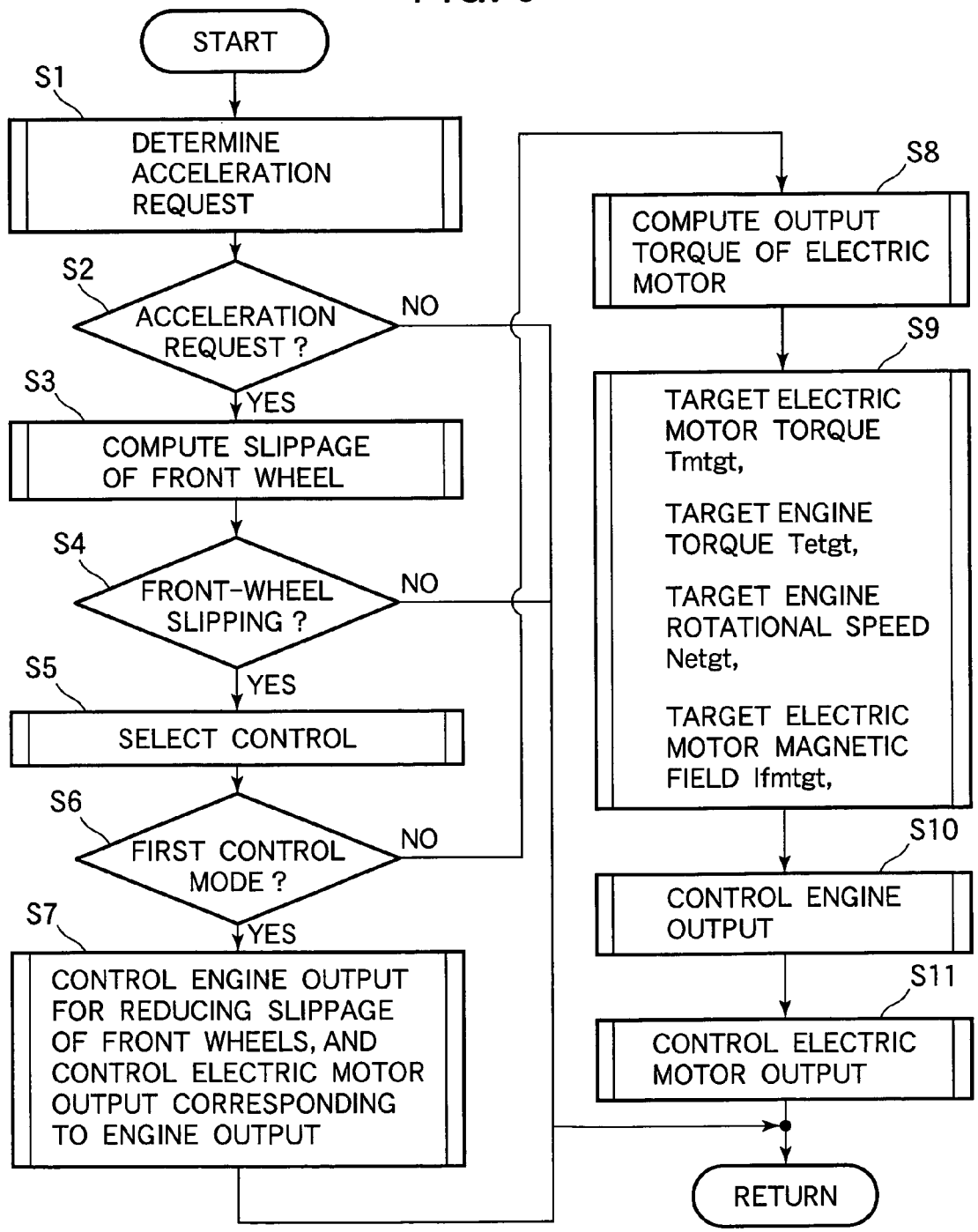
FIG. 9 is a flowchart for describing the processing performed by electric-motor output control means according to an embodiment of the present invention.

FIGS. 9 through 13 are flowcharts for describing control processing performed by output control means formed of the electric-motor output control means 35 and the engine output control means. FIG. 9 shows the control processing performed by the electric-motor output control means 35, which is the most essential part of the present embodiment. In Step S1, the system determines the presence or absence of the acceleration request, and calculates the acceleration request value. In Step S2, in the event that the system determines the presence of the acceleration request, the flow proceeds to Step S3, where the system performs following processing, otherwise, the processing ends. In Step S3, the system calculates the slippage based upon the front-wheel speed and the rear-wheel speed according to Expression (2) for detecting the slippage of the front wheels. In Step S4, the slippage is compared to a predetermined value (e.g., 20%) so as to make determination whether or not slipping of the front wheels occurs. Note that while description has been made regarding an arrangement wherein the system detects the slipping of the front wheels in the event that the slippage, which is obtained by dividing the difference in the rotational speed between the engine-driven wheels and the electric-motor-driven wheels by the driving speed of the vehicle, exceeds a predetermined value, an arrangement may be made wherein the system detects the slipping thereof in the event that the speed of the engine-driven wheels exceeds the speed of the vehicle, and furthermore, an arrangement may be made wherein the system detects the slipping thereof in the event that the rotational speed of the engine-driven wheels exceeds the rotational speed of the electric-motor-driven wheels.

In the determining Step, i.e., Step S4, in the event that the system detects the slipping of the front wheels, the flow proceeds to Step S5, otherwise, the processing ends. In Step S5, determination is made whether the system performs control processing according to the first control method wherein the engine output is reduced for suppressing the slipping of the front wheels, or according to the second method wherein the engine output is increased for increasing the driving force of the rear wheels. Note that the system may determine the control method according to the signals received from the switch 12 for the user switching the control method, or the system may be automatically determined the control method based upon the wheel speed and the stepping amount of the accelerator pedal from the user, as described later. For example, in the event that the user selects the first control method through the switch 12, the system sets the flag stored within the controller, CntrlFlag, to 1. On the other hand, in the event that the user selects the second control method through the switch 12, the system sets the flag CntrlFlag to 2.

In Step S6, the system checks the flag which indicates the determination results obtained in Step S5, and in the event that the flag CntrlFlag matches "1", the flow proceeds to Step S7, where the system performs control processing according to the first control method. On the other hand, in the event that the flag CntrlFlag matches "2", the flow proceeds to Step S8, where the system performs control processing according to the second control method. In Step S7, the system performs control processing according to the first control method, wherein the system reduces the output of the engine so as to suppress the slipping of the front wheels, and accordingly, the output of the generator is reduced corresponding to the reduction of the engine output, whereby the processing ends.

Figure 11:
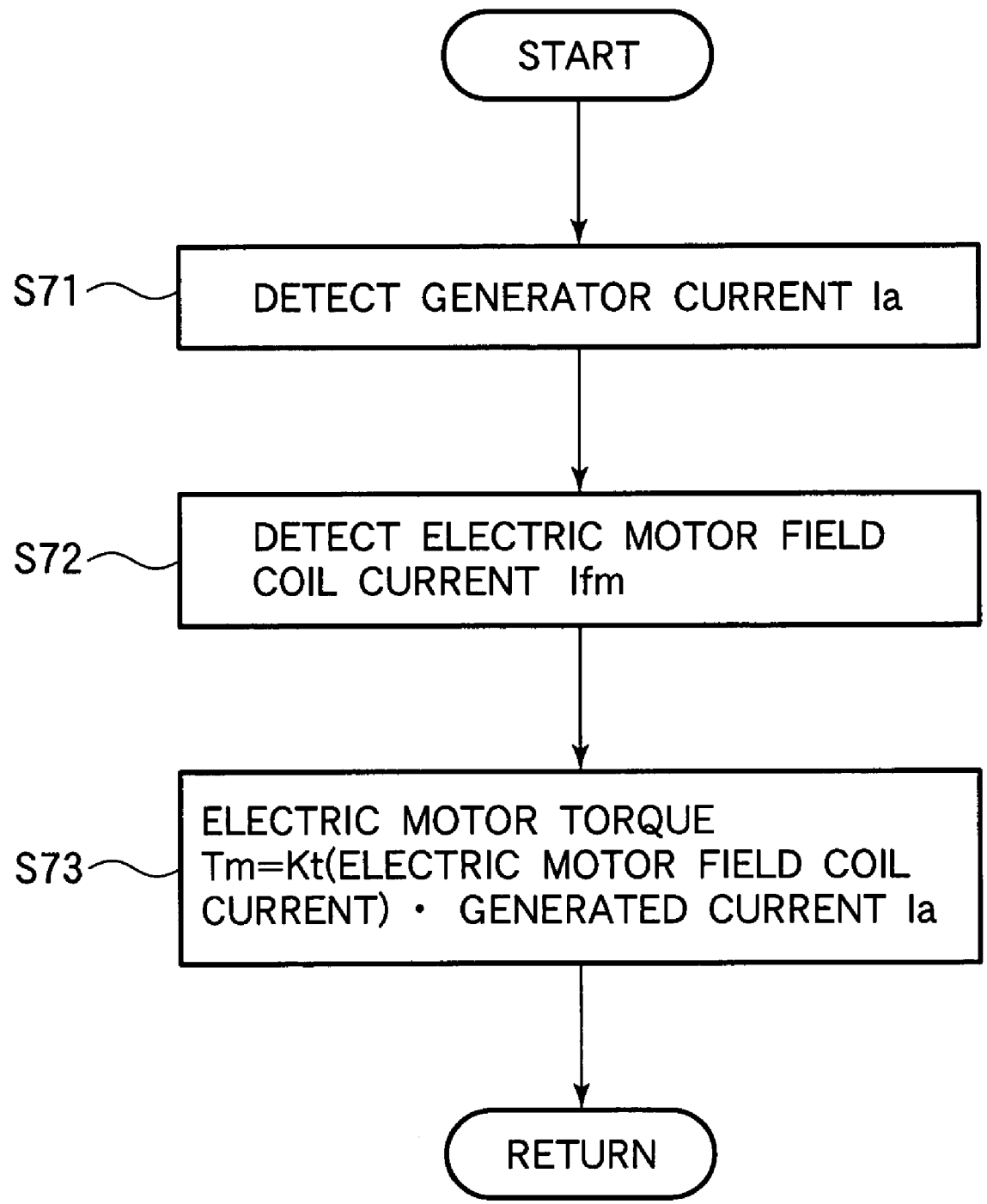
FIG. 11 is a flowchart for making detailed description regarding the processing performed in Step S8 shown in FIG. 9.
Figure 13:
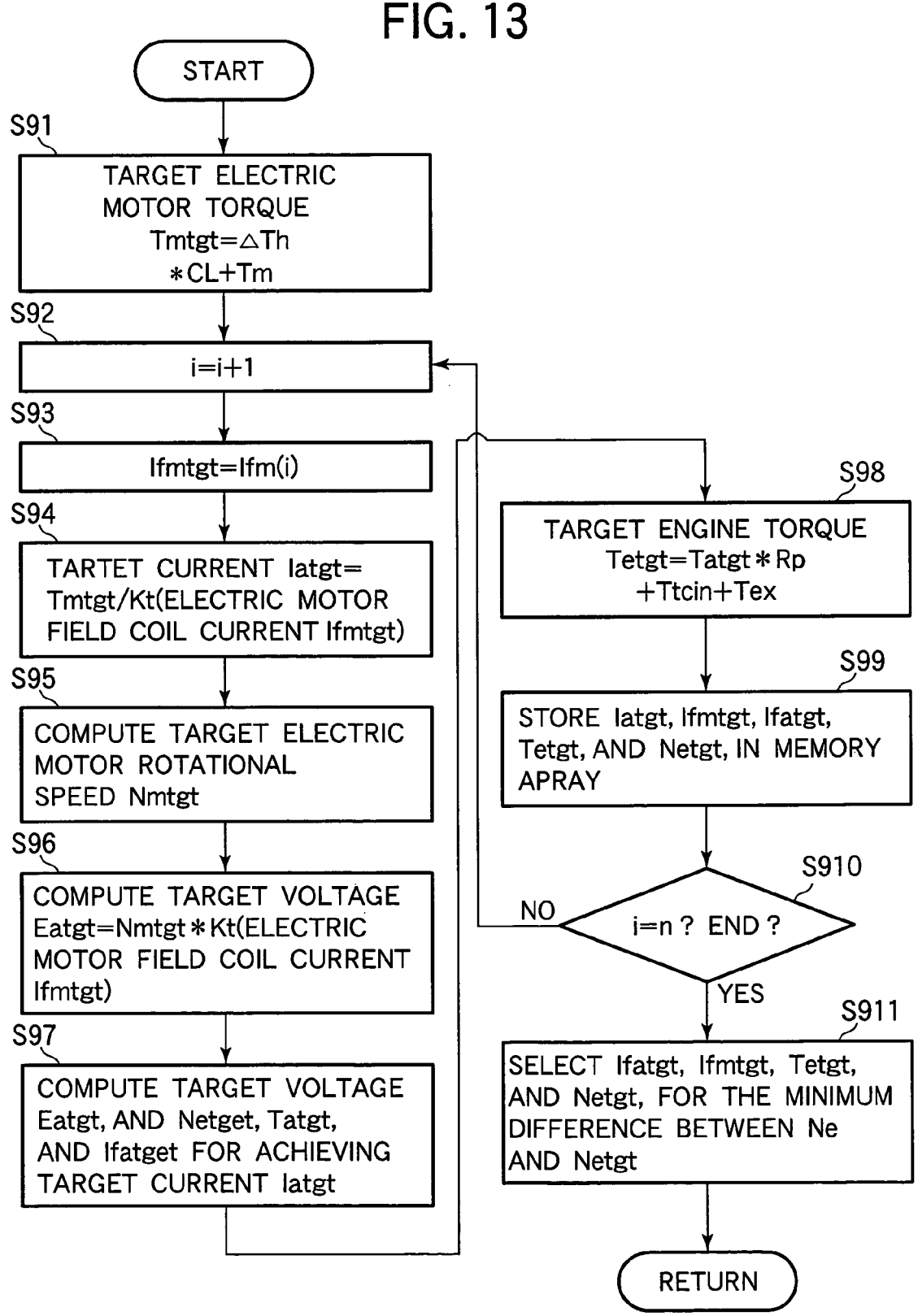
FIG. 13 is a flowchart for making detailed description regarding the processing performed in Step S9 shown in FIG. 9.

The control processing according to the second control method is performed in Steps S8 through S11. First, in Step S8, the system calculates the present output torque of the electric motor. The computing method is shown in FIG. 11. Next, in Step S9, the system determines the target electric-motor torque (output) of the electric motor based upon the acceleration request value for the vehicle; and further determines the target engine rotations, the target engine torque, and the target field-coil current of the generator, required for outputting the target electric-motor torque. The detailed computing method is shown in FIG. 13. In Step S10, the engine output control means 34 perform output control of the engine based upon the target engine rotations and the target engine torque. Subsequently, in Step S11, the electric-motor output control means 35 control the field-coil current of the generator based upon the target electric-motor torque, whereby the processing ends.

The system performs the processing described above, whereby the processing shown on the right side in FIG. 8 is performed, thereby suppressing deterioration in the acceleration performance of the vehicle in a case of slipping of the engine-driven wheels during acceleration of the vehicle.

Figure 10:
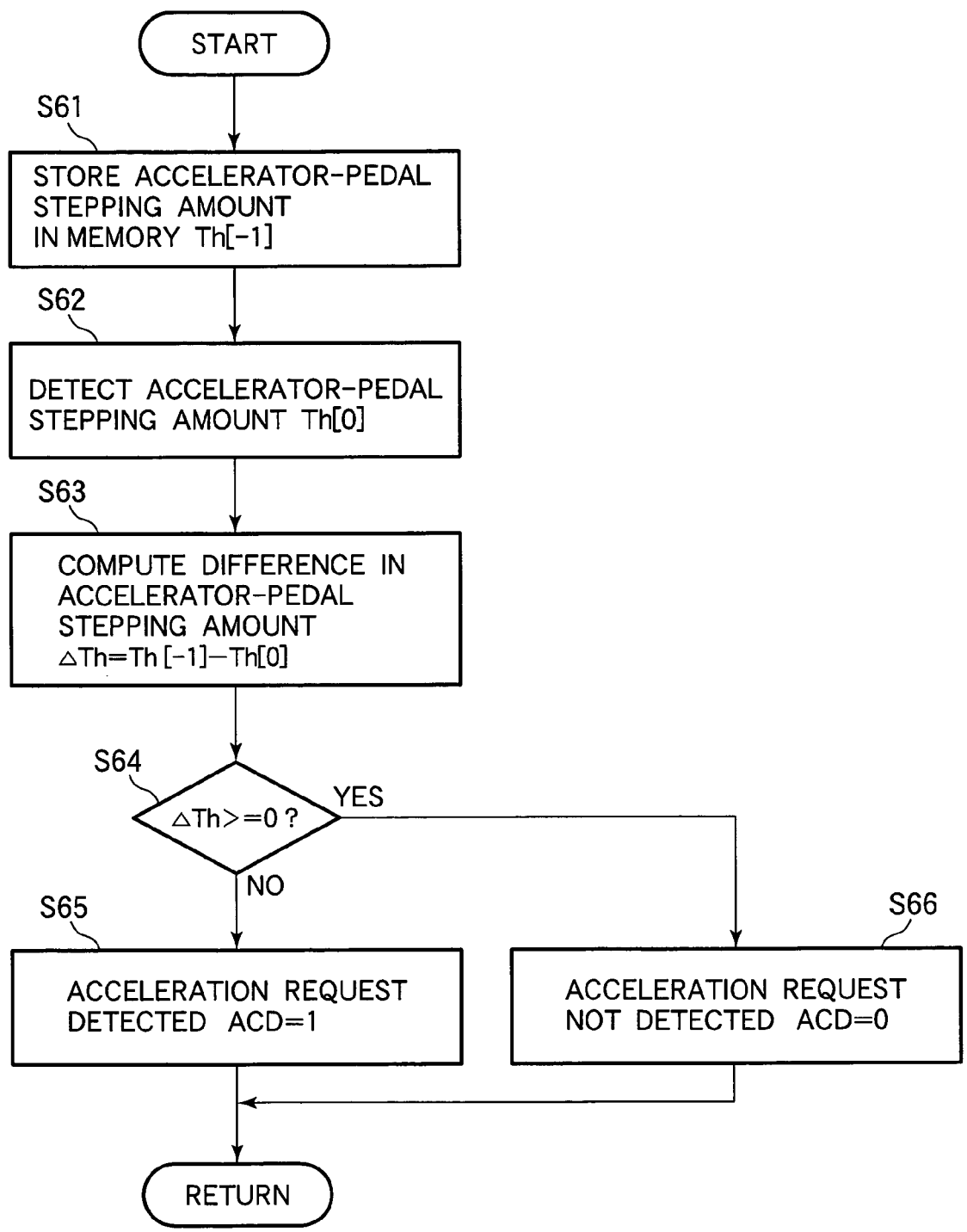
FIG. 10 is a flowchart for making detailed description regarding the processing performed in Step S1 shown in FIG. 9.

Detailed description will be made below regarding the principal steps with reference to FIGS. 10 through 13. FIG. 10 is a flowchart for making detailed description regarding the method for determining the presence or absence of the acceleration request, which is performed in Step S1. First, in Step S61, the system reads out and stores the signal Th[−1] from the accelerator-pedal sensor 13. Next, in Step S62, the system reads out the next signal Th[0] from the accelerator-pedal sensor 13 in the same way. Then, in Step S63, the system calculates and stores the value ΔTh wherein the new value Th[0] from the accelerator-pedal sensor 13 is subtracted from the old value Th[−1] thereof. In Step S64, in the event that ΔTh is a positive value, the system determines that the user has stepped the accelerator pedal, and the flow proceeds to Step S65, wherein the system sets the acceleration request flag ACD to "1", whereby the step ends. On the other hand, in Step S64, in the event that ΔTh is a negative value, the system determines that the acceleration request has not made, the flow proceeds to Step S66, where the system sets the acceleration request flag ACD to "0", whereby the processing ends.

FIG. 11 is a flowchart for making detailed description regarding the processing for computing the present motor output torque, which is performed in Step S8. In Step S71, the current sensor 14 detects the current supplied to the electric motor, i.e., the generated current Ia. In Step S72, the system estimates the current Ifm supplied to the field coil of the electric motor based upon the PWM ratio controlled by the controller 4. In Step S73, the system calculates the electric-motor torque Tm based upon the aforementioned information, whereby the step ends. Here, the electric-motor torque Tm is determined by the product of the generated current Ia and the electric-motor torque constant Kt. Note that Kt is determined dependent upon the field-coil current, and accordingly, with the present embodiment, the system stores the relation between the torque constant Kt and the PWM ratio in the form of a table beforehand, and the torque constant Kt is determined for each case by searching the table.

Figure 12:
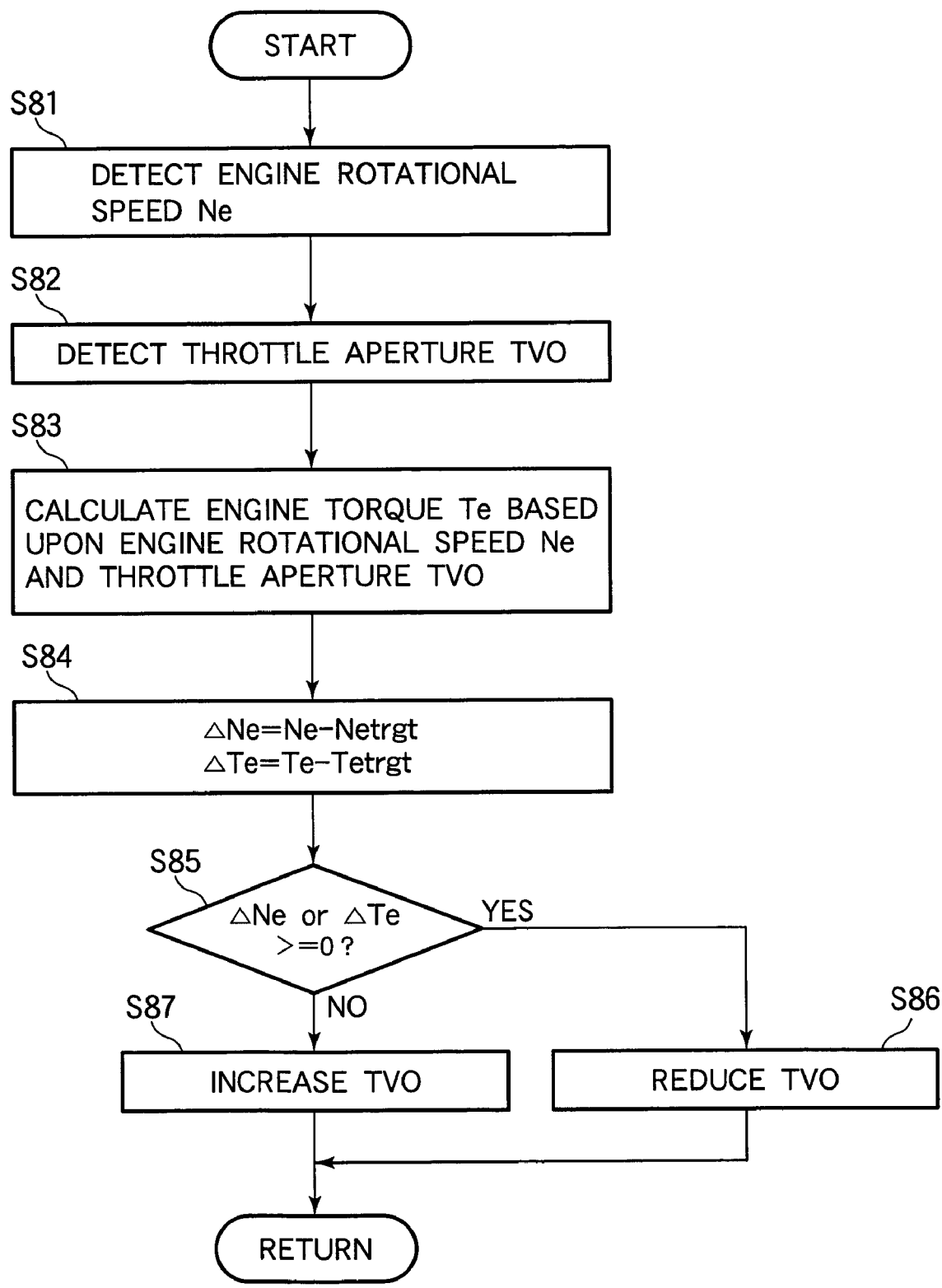
FIG. 12 is a flowchart for making detailed description regarding the processing performed in Step S10 shown in FIG. 9.

FIG. 12 is a flowchart for making detailed description regarding the processing for controlling the engine output performed in Step S10. In Step S81, the system calculates the engine rotational speed Ne based upon the signals received from the engine-rotation sensor 1b. In Step S82, the system detects the throttle position TVO using a throttle position sensor which can be electronically controlled. Subsequently, in Step S83, the system calculates the engine torque Te based upon the engine rotational speed Ne and the throttle position TVO using the data of the relation between the engine rotational speed, the aperture of the throttle valve, and the engine torque, which has been stored beforehand. Subsequently, in Step S84, the system calculates the difference ΔNe wherein the target engine rotational speed Netrgt is subtracted from the engine rotational speed Ne, as well as calculating ΔTe which is the difference between the engine output torque Te and the target engine torque Tetgt. Note that the target engine rotational speed Netrgt and the target engine torque Tetgt are obtained in the processing shown in FIG. 13, which will be described later. Subsequently, in Step S85, in the event that ΔNe or ΔTe is zero or more, the flow proceeds to Step S86, where the throttle is reduced. Otherwise, the flow proceeds to Step S87 where the throttle is increased, following which the processing ends.

FIG. 13 is a flowchart for making detailed description regarding the processing for controlling the output of the electric motor performed in Step S9. In Step S91, the system computes the target electric-motor torque Tmtgt. The target electric-motor torque Tmtgt is calculated as follows. That is to say, the change in the stepping amount of the accelerator pedal, ΔTh, indicating the acceleration request value which has been calculated, is multiplied by a constant C1, and the sum of the product thus obtained and the present motor torque Tm is made, whereby the sum thus obtained is determined as the target electric-motor torque Tmtgt. Note that the value C1 used here is not restricted to a constant, rather, an arrangement may be made wherein C1 is determined corresponding to ΔTh such that the change in the target electric-motor torque is suppressed for a small stepping amount of the accelerator pedal, thereby enabling smooth acceleration of the vehicle.

On the other hand, the output of the electric motor is dependent upon four parameters of: (1) the generated current Ia; (2) the field-coil current Ifm of the electric motor; (3) rotational speed Ne of the engine proportional to the rotational speed Na of the generator; and (4) the field-coil current Ifa of the generator. In this case, there are multiple parameters for achieving the desired target electric-motor torque, and accordingly, with the present embodiment, the system selects a combination of the parameters such that the present operation state of the engine exhibits as small a change as possible. While this leads to increased calculation amounts, the system has the first advantage of suppressing the great change in the engine speed, thereby enabling acceleration of the vehicle without unpleasant sensation of the passengers. Furthermore, the system has the second advantage of immediately achieving the target electric-motor output torque, since there is no need to greatly change the output of the engine which has a slow response as compared with the generator and the electric motor.

Description will be made regarding the processing procedure in Steps S92 through S911, wherein the output control conditions are determined such that the engine operation state exhibits as small change from the present engine operation state as possible for outputting the target electric-motor torque. In FIG. 13, in Step S92, the system set a counter i (i denotes an integer) for counting the number wherein the loop processing has been performed, more specifically, the system increments the counter by 1 for each loop processing. In Step S93, the PWM ratio of the field-coil current Ifm is divided into an n (n represents an integer) number of PWM ratio units from 0% up to 100%, and the field-coil current corresponding to the i-numbered PWM ratio unit is set to the temporary target motor-field-coil current Ifmtgt. In Step S94, the target electric-motor torque Tmtgt, which has been obtained in Step S91, is divided by the torque constant Kt for calculating the target current Iatgt. The torque constant Kt is dependent upon the electric-motor-field-coil current Ifmtgt, and accordingly, the system determines the torque constant Kt using a table wherein the relation therebetween has been stored beforehand. In Step S95, the system determines the target motor rotational speed Nmtgt, independent of the aforementioned processing. Here, the system may determine the target motor rotational speed Nmtgt to be the present motor rotational speed, for example.

Furthermore, the system preferably determines the target motor rotational speed Nmtgt to be a value greater than the present motor rotational speed, corresponding to the aperture of the accelerator pedal for correcting the response of the accelerator pedal. In Step S96, the system computes the product of the target motor rotational speed Nmtgt and the torque constant Kt, whereby the target generated voltage Eatgt is determined to be the product thus obtained.

In Step S97, the system calculates the engine rotational speed Ne, the generator field-coil current Ifmtgt, and the generator torque Ta, for achieving both the target generated voltage Eatgt and the target generated current Iatgt. Note that the system prepares a map including the relation between: the generated voltage; the generated current; the field-coil current; and the generator torque, for each engine rotation Ne, (e.g., by steps of 100 rotations/minute), for performing the aforementioned computation processing. Specifically, the system searches the map for the values corresponding to the target generated voltage Eatgt and the target current Iatgt, whereby the engine rotational speed Ne, the generator field-coil current Ifmtgt, and the generator torque Ta, are obtained corresponding to the target generated voltage Eatgt and the target current Iatgt. In the event that the system has picked up the multiple values of the engine rotational speed, the system selects the engine rotational speed closest to the present engine rotational speed as the target engine rotational speed Netgt, and selects the corresponding generator field-coil current as the target generator field-coil current Ifmtgt, whereby the system stores the target engine rotational speed Netgt and the target generator field-coil current Ifmtgt, thus determined; and the corresponding generator torque Ta.

In Step S98, the system determines the target engine torque Tetgt based upon the generator torque Ta obtained in Step S97. First, the system calculates the product of the generator torque Ta and the pulley ratio Rp, whereby the load torque corresponding to that of the engine output shaft is calculated. Furthermore, the system makes the sum of: the load torque thus obtained; the torque Ttcin transmitted to the torque converter, which is calculated based upon the present front-wheel speed and the target engine rotational speed Netgt; and the other term Tex which is the sum of the driving torque of the other sub-members of the engine, the friction torque, and so forth, whereby the target engine torque Tetgt is calculated.

In Step S99, the system stores the results thus obtained, in the memory. Specifically, the system stores: the target motor-field-coil current Ifmtgt; the target generated current Iatgt generated by the generator; the target generator field-coil current Ifatgt for obtaining the target generated current; the target engine torque Tetgt; and the target engine rotational speed Netgt. As described above, the loop processing in Steps S93 through S99 is repeated n times, and accordingly, in Step S910, the flow returns to Step S93 until the counter i reaches n.

In Step S911, the system searches the memory storing the results thus obtained, for the target rotational speed Netgt closest to the present engine rotational speed, and further selects: the target electric-motor-field-coil current Ifmtgt; the target generator generated current Iatgt; the target generator-field-coil current Ifatgt for achieving the target generated current; and the target engine torque Tetgt, corresponding to the selected target rotational speed Netgt, whereby the processing ends.

In Step S10 shown in FIG. 9, the system adjusts the electronically-controlled throttle 1a so as to control and increase the output of the engine 1 based upon the target engine torque Tetgt and the target engine rotational speed Netgt, thus obtained. Furthermore, in Step S11 shown in FIG. 9, the system controls the generator 2 and the motor 5 so as to increase the driving force of the electric-motor-driven wheels 8 based upon the target electric-motor-field-coil current Ifmtgt, the target generator generated current Iatgt, and the target generator-field-coil current Ifatat.

Thus, with the second control method according to the present embodiment, in a case of slipping of the engine-driven wheels 9, the system increases the output of the engine 1 so as to increase the driving force of the electric-motor-driven wheels 8, unlike the conventional one, thereby increasing the total driving force of the engine-driven wheels 9 and the electric-motor-driven wheels 8, and thereby improving the acceleration performance. In other words, with the second control method described above, while the system does not suppress slipping of the engine-driven wheels 9, the increase of the effective driving force of the electric-motor-driven wheels 9 is greater than the decrease of the effective driving force of the engine-driven wheels 9, thereby improving acceleration performance.

Figure 14:
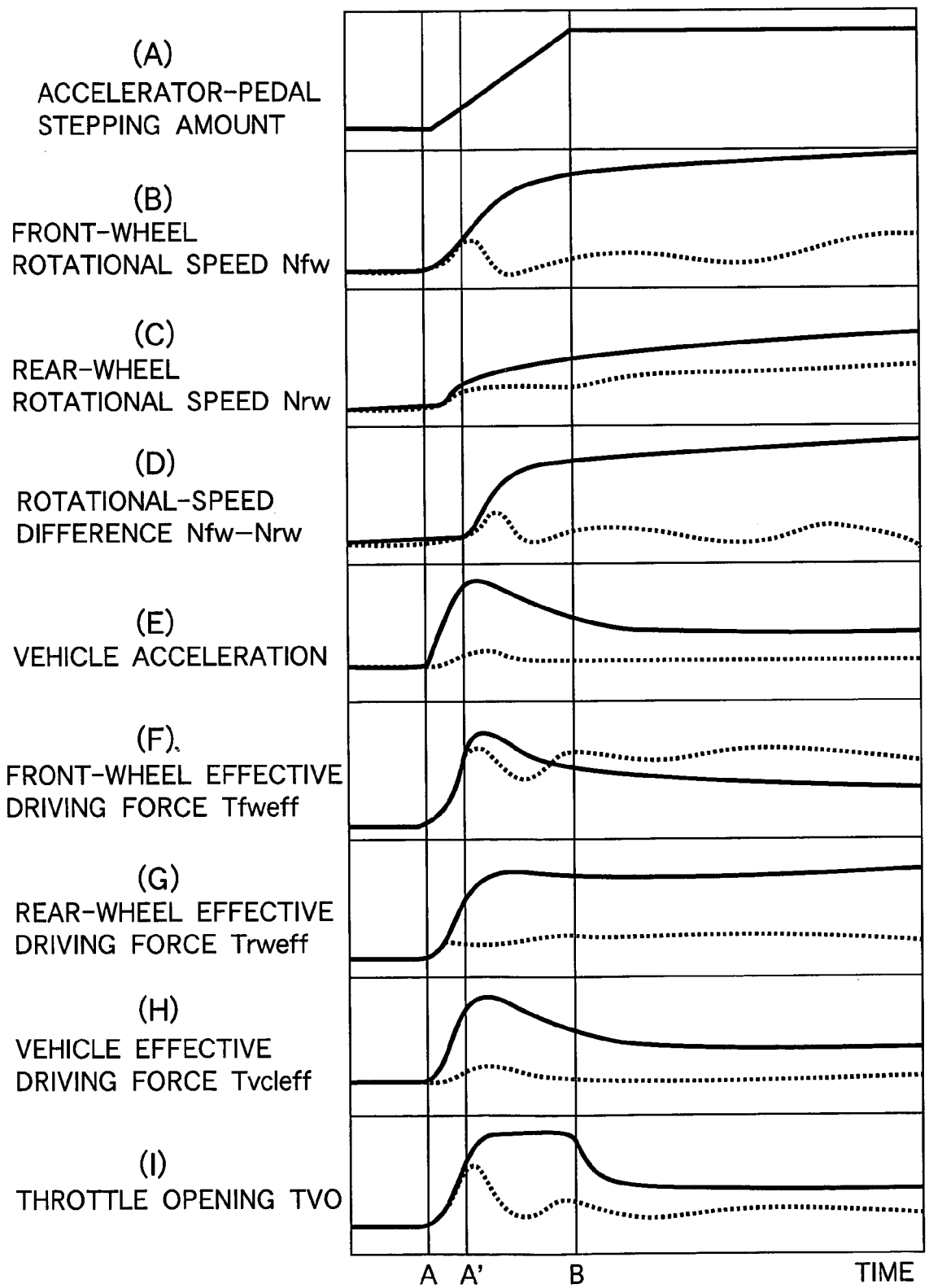
FIGS. 14A through 14I show time charts for describing change in the driving state of each component of the vehicle according to the second control method of the present invention.

That is to say, the second control method according to the present embodiment improves the acceleration driving performance in a case of slipping during acceleration as shown in FIG. 14. FIG. 14 shows the operation of the hybrid-four-wheel-drive vehicle according to the present embodiment in a case wherein the vehicle climbs an icy uphill slope, wherein the second control method exhibits greater hill-climbing acceleration than with the first control method. FIG. 14A shows the operation of the accelerator pedal by the user, wherein at the point in time A, the user starts stepping of the accelerator pedal, and maintains the stepping amount thereof from the point in time B. FIG. 14B shows the front-wheel speed, and FIG. 14C shows the rear-wheel speed, corresponding to the duration shown in FIG. 14A. In the drawings, the solid lines represent the operation of the hybrid-four-wheel-drive vehicle according to the second control method, and the broken lines represent the operations thereof according to the first control method. Note that with the first control method, in the event that the system detects slipping of the front wheels, the system reduces the output of the engine so as to suppress slipping thereof for increasing the driving force of the engine-driven front wheels, which is applied to conventional hybrid-four-wheel-drive vehicles including a so-called a traction control device.

As can be understood from comparison between the front-wheel-speed data represented by the solid line and the broken line shown in FIG. 14B, with the second control method, upon the user stepping the accelerator pedal, the front-wheel speed increases at a constant rate. On the other hand, with the first control method, the front-wheel speed does not increase from the point in time A' shown in FIG. 14D, at which the difference in speed between the front and rear wheels exceeds a predetermined value, by the actions of the traction control device. Note that the transaction control device controls so as to reduce the throttle valve aperture TVO based upon the stepping amount of the accelerator-pedal, and accordingly, the action of the traction control device can be confirmed by monitoring the action of the throttle valve aperture TVO. As shown in FIG. 14I, with the first control method, the throttle valve aperture TVO is temporarily reduced during a period in time from the point A'. Subsequently, the throttle valve aperture is controlled independent of intention of the user (the stepping amount of the accelerator pedal).

FIG. 14E shows the acceleration data of the vehicle, wherein the acceleration of the vehicle controlled according to the second control method represented by the solid line exhibits increased acceleration, despite slipping of the front wheels. Description will be made below regarding the mechanism with reference to FIGS. 14F, 14G, and 14H, which show the change in the front-wheel driving force over time, the change in the rear-wheel driving force over time, and the change in the total driving force, respectively. As shown in FIG. 14F, with the second control method, the effective front-wheel driving force Tfweff is gradually reduced from the point in time of occurrence of front-wheel slipping. The reason is that the system controls the throttle so as to increase the throttle valve aperture TVO for increasing the generated electric power generated by the generator as shown in FIG. 14I, leading to reduced effective driving force as described with reference to FIG. 8. On the other hand, in this case, the output of the electric motor is increased so that the increase of the effective rear-wheel driving force is greater than the decrease of the effective front-wheel driving force as shown in FIG. 14G. As a result, the second control method effects the increased effective driving force of the vehicle as compared with the first control method, as shown in FIG. 14H.

Next, description will be made below regarding switching means for switching between the first control method and the second control method in Step S5 shown in FIG. 9, by way of a specific arrangement example shown in FIGS. 15 and 16. FIG. 15 shows an arrangement wherein the user selects a desired control method from the first and second control methods through a switch. FIG. 16 shows an arrangement wherein the system automatically switches the control method corresponding to driving situations of the vehicle.

Figure 15A:
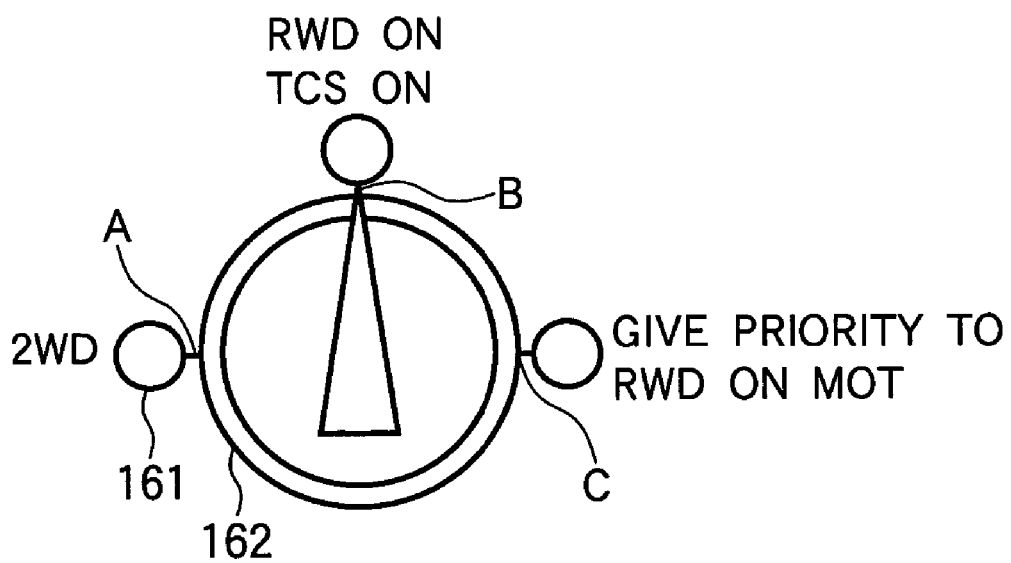
FIGS. 15A and 15B are diagrams which show configuration of a switch for making switching between the first and second control methods according to the present invention.
Figure 15B:
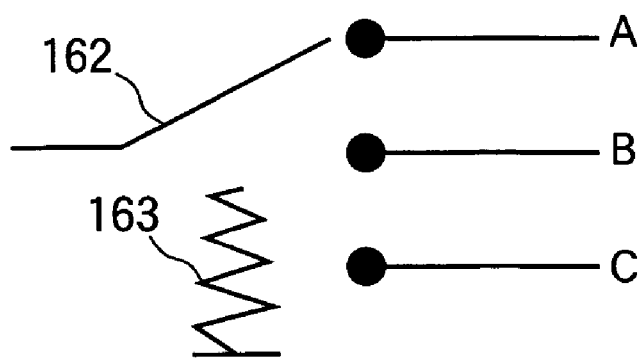

FIGS. 15A and 15B show a configuration of the switch 12 shown in FIG. 1, wherein FIG. 15A is a front view of the switch 12, and the FIG. 15B is a conceptual configuration diagram thereof. The switch 12 has a configuration wherein the user selects the control method by turning a knob 162. Specifically, upon the user setting the knob 162 to the position A, the two-wheel-drive (2WD) mode, wherein the vehicle is driven by the engine alone, is selected. On the other hand, upon the user setting the knob 162 to the position B, or C, the four-wheel-drive (4WD) mode is selected. In particular, upon the user setting the knob 162 to the position B, the system selects the first control method (MOT-priority mode), and upon the user setting the knob 162 to the position C, the system selects the second control mode (TCS). As described above, with the present embodiment, the user can select a desired control method from the prepared control methods by only operating the single switch 12, thereby facilitating the user to confirm the presently-selected control method, as well as facilitating the user to select a desired control method. Furthermore, the switch 12 includes a spring 163 at the position C as shown in FIG. 15B, and has a configuration wherein upon the user turning the knob 162 to the position C, the knob 162 is automatically returns to the knob position B after a predetermined period of time. The reason is that following control processing according to the second control method thus selected wherein the system gives priority to the increase of output of the electric motor so as to increase the driving force of the rear wheels under conditions such as driving on an icy uphill slope, the system automatically switches the presently-selected control method back to the first control method wherein the system gives priority to suppression of slipping of the front wheels during acceleration, thereby preventing deterioration in the lifespan of the electric motor due to excessive use thereof, and thereby preventing deterioration in the driving performance of the vehicle. Note that with such a configuration wherein the presently-selected control method is automatically returned back to the first control method, the user cannot confirm whether the system presently selects the first control method or the second control method only by checking the switch position. Accordingly, with the present embodiment, the switch 12 further includes lamps 161 at the knob positions A, B, and C, for indicating the presently-selected control method, thereby notifying the user of the presently-selected control method in a sure manner. Note that the type of the switch 12 used here is not restricted to a rotary switch as shown in FIG. 15, rather, a push-button switch, a rocker switch, may be employed as the switch 12.

Next, description will be made regarding an arrangement wherein the system automatically makes switching between the first and second control methods corresponding to driving situations of the vehicle with reference to FIG. 16. In Step S101, the system computes and stores the effective driving force Tfweff which is a part of the front-wheel driving force and contributes acceleration of the vehicle. The computation processing is consecutively performed, and the system stores the history data for the past five seconds, for example. The effective driving force Tfweff is calculated based upon: the driving force of the front wheels; the driving force of the rear wheels; the front-wheel acceleration obtained by differentiating the front-wheel speed; the speed and the acceleration of the rear wheels; the mass of the vehicle; and the acceleration of the vehicle. Note that the acceleration of the vehicle may be obtained using an acceleration sensor, or may be calculated based upon the rear-wheel speed for simplification. Now, description will be made below by way of the aforementioned simple method. The effective front-wheel driving force Tfweff matches the difference between the front-wheel driving force Tfw and the torque which contributes acceleration of the front wheels. Here, the torque which contributes acceleration of the front wheels is calculated by making the product of the moment of inertia of the front wheels and the driving system thereof, Jfw, and the angular acceleration Nrw. Note that the angular acceleration is calculated by differentiating the wheel speed detected by the speed detecting means. The computation processing described above is represented by the following Expression (3).

$$Tfweff = Tfw - Jfw \cdot Nrw \quad (3).$$

In Step S102, the system computes and stores the effective rear-wheel driving force Trweff based upon: the rear-wheel driving force, Trw; the moment of inertia of the driving system of the rear wheels, Jrw; and the angular acceleration thereof, Nfw, in the same way as in Step S101.

In Step S103, the system calculates the vehicle-acceleration request value based upon the stepping amount of the accelerator pedal, and further calculates the target total effective driving force, Tvclefftgt, for the front and rear wheels for achieving the acceleration request. The target total effective driving force Tvclefftgt is obtained by making the sum of: the effective front-wheel driving force Tfweff; the effective rear-wheel driving force Trweff; and the product of the change in the stepping amount of the accelerator pedal ΔTh, which has been computed and indicates the acceleration request, and a constant C2.

In Step S104, the system calculates the maximum effective front-wheel driving force Tfweffmax based upon the history data of the front-wheel slippage, the history data of the effective driving force thereof, and the history data of the driving force thereof. Note that in a case of the maximum front-wheel slippage stored in the history data of 10% or less, the system obtains the maximum effective driving force by extrapolating the history data of the effective driving force in the slippage range of 10 to 20%.

In Step S105, the system performs the computation processing for calculating the maximum effective rear-wheel driving force Trweffmax in the same way as in Step S104. In this case, with an arrangement wherein the slippage can be calculated using the data from the acceleration sensor or the like, the rear-wheel slippage can be calculated in the same way as with the front-wheel slippage. However, with the present arrangement employing the aforementioned simple method wherein the vehicle speed is calculated based upon the rear-wheel speed, the rear-wheel slippage cannot be calculated. Accordingly, in this case, the maximum effective rear-wheel driving force is set to a predetermined value beforehand.

In Step S106, the system calculates the difference between the present effective front-wheel driving force Tfweff and the maximum effective driving force Tfweffmax, whereby the front-wheel driving-force margin ΔTfweff up to the maximum effective driving force is obtained. In Step S107, the system calculates the rear-wheel driving force margin ΔTrweff in the same way.

In Steps S108 through S112, the system computes reduction of the effective front-wheel driving force and the increase of the effective rear-wheel driving force in a case of control processing according to the second control method wherein the system increases the engine rotations and engine torque so as to increase the output of the electric motor for achieving the target acceleration of the vehicle, whereby the total effective driving force Tvcleff2 is obtained. On the other hand, in Steps S113 through S115, the system calculates the total effective driving force Tvcleff1 for the front and rear wheels in a case of control processing according to the first control method wherein the system reduces the engine output so as to increase the effective front-wheel driving force.

In Step S108, the system calculates the target electric-motor torque Tmtgt2. The target electric-motor torque Tmtgt2 is calculated as follows. That is to say, the maximum effective front-wheel driving force Tfweffmax calculated in Step S104 is multiplied by a constant C3. Subsequently, this value thus obtained is subtracted from the target total effective driving force Tvcllefftgt for the front and rear wheels, calculated in Step S103, on the assumption that slipping of the rear wheels does not occur, whereby the target rear-wheel driving force Trwtgt is obtained. Subsequently, the system calculates the target electric-motor torque Tmtgt2 based upon the target rear-wheel driving force Trwtgt, giving consideration to the reduction ratio of the differential mechanism. While strictly, the effective front-wheel driving force changes corresponding to the slippage of the front wheels, in practice, an arrangement may be made wherein the effective front-wheel driving force is determined to be the maximum effective front-wheel driving force multiplied by the constant C3 which represents an integer less than 1, for reducing calculation time. Here, the empirical constant C of 0.8 is employed.

In Step S109, the system computes the target engine rotational speed Netgt and the target engine torque Tetgt, required for outputting the target electric-motor torque Tmtgt. The computation processing is performed in the same way as in Steps S91 through S911.

In Step S110, the system calculates the front-wheel driving force Tfw2 based upon the target engine rotational speed Netgt, the target engine torque Tetgt, and the properties of the torque converter. In Step S111, the system calculates the effective front-wheel driving force Tfweff2 based upon the front-wheel driving force Tfw1.

In Step S112, the system makes the sum of the effective front-wheel driving force Tfweff2 and the effective rear-wheel driving force Trweff2, whereby the total effective driving force Tvcleff2 for the front and rear wheels is obtained.

In Step S113, the system calculates the engine rotational speed Ne and the engine torque Te for achieving the maximum effective front-wheel driving force Tfweffmax, giving consideration to a case wherein the system selects the first control method. Note that the computation is made based upon the front-wheel rotational speed and the properties of the torque converter.

In Step S114, the system calculates the electric-motor torque Tm based upon the generated voltage and current from the generator, calculated based upon the target rotational speed Netgt and the target engine torque Tetgt, which have been obtained in Step S113, and further calculates the rear-wheel driving force and the effective rear-wheel driving force Trweff1.

In Step S115, the system makes the sum of the effective rear-wheel driving force Trweff1 and the target maximum effective front-wheel driving force Tfweffmax, obtained in Steps S112 through S114, whereby the effective driving force Tvcleff1 according to the first control method is determined.

In Step S116, the system makes comparison between the total effective driving force Tvcleff1 obtained in Step S114 and the total effective driving force Tvcleff2 obtained in Step S112. In the event that determination has been made that Tvcleff1 is greater than Tvcleff2, the flow proceeds to Step S117, wherein the system sets the flag CntrlFlag to "1" for selecting the first control method. On the other hand, in the event that determination has been made that Tvcleff2 is greater than Tvcleff1, the flow proceeds to Step S118, wherein the system sets the flag CntrlFlag to "2" for selecting the second control method.

That is to say, the automatic switching means shown in FIG. 16 comprises: effective driving force computation means (S102, S102) for computing the effective engine-driven-wheel driving force and the effective electric-motor-driven-wheel driving force; acceleration driving force computation means for computing the acceleration driving force C2·ΔTh for all the driven wheels corresponding to the acceleration request value; target effective driving force computation means (S103) for computing the target effective driving force by making the sum of the present effective engine-driven-wheel driving force, the present electric-motor-driven-wheel driving force, computed by the effective driving force computation means, and the acceleration driving force; effective driving force history computation means (S101, S102) for creating the history data of the effective engine-driven-wheel driving force and the effective electric-motor-driven-wheel driving force corresponding to the last slippage data for a predetermined past period; and maximum effective driving force computation means (S104, S105) for calculating the maximum effective engine-driven-wheel driving force and the maximum effective electric-motor-driven-wheel driving force based upon the history data. Thus, the system obtains the relation between the slippage and the effective driving force shown in FIG. 5, determined by the relation between the road on which the vehicle is presently driven and the properties of the driven wheels.

Subsequently, in Steps S108 through S112, the system estimates the total effective driving force in a case of selecting the second control method, based upon the relation between the present slippage and the effective driving force calculated in Steps S101 through S105. On the other hand, in Steps S113 through S115, the system estimates the total effective driving force in a case of selecting the first control method in the same way. Subsequently, in Step S116, the system makes comparison between the estimated total effective driving force according to the first control method and the estimated total effective driving force according to the second control method, and the control method corresponding to the greater total effective driving force is selected.

In other words, the switching means shown in FIG. 16 comprises: the effective driving force computation means (S101, S102) for computing the present effective engine-driven-wheel driving force and the present effective electric-motor-driven-wheel driving force; the acceleration driving force computation means (S63 in FIG. 10) for computing the acceleration driving force for achieving the acceleration request value; the target effective driving force computation means (S103) for computing the target effective driving force by making the sum of the present effective engine-driven-wheel driving force, the present electric-motor-driven-wheel driving force, computed by the effective driving force computation means (S101, S102), and the acceleration driving force; the effective driving force history computation means (S101, S102) for creating the history data of the effective engine-driven-wheel driving force and the effective electric-motor-driven-wheel driving force corresponding to the last slippage data for a predetermined past period; and the maximum effective driving force computation means (S104, S105) for calculating the maximum effective engine-driven-wheel driving force and the maximum effective electric-motor-driven-wheel driving force based upon the history data.

Furthermore, the switching means shown in FIG. 16 further comprises: first target engine-output computation means (S113) for calculating the first target engine output corresponding to the maximum effective engine-driven driving force obtained by the maximum effective driving force computation means (S104, S105); effective driving force computation means (S114) for computing the effective engine-driven-wheel driving force and the effective electric-motor-driven-wheel driving force corresponding to the first target engine output based upon the aforementioned history data; and first total effective driving force calculating means (S115) for calculating the target total effective driving force for the engine-driven wheels and the electric-motor-driven wheels according to the first control method.

Furthermore, the switching means shown in FIG. 16 further comprises: target electric-motor-driven-wheel driving force computation means (S108) for calculating the target driving force of the electric-motor-driven wheels by subtracting the maximum effective engine-driven-wheel driving force multiplied by a predetermined reduction coefficient from the target effective driving force obtained by the target effective driving force computation means (S103); target electric-motor torque computation means (S108) for calculating the target electric-motor torque based upon the target driving force of the electric-motor-driven wheels; second target engine output computation means (S109) for calculating the target engine output required for achieving the target electric-motor output; target effective engine-driven-wheel driving force computation means (Sl10, S111) for calculating the target effective driving force of the engine-driven wheels corresponding to the aforementioned target engine output; and second total effective driving force computation means (S112) for calculating the target total effective driving force according to the second control method by making the sum of the target effective electric-motor-driven-wheel driving force and the target effective engine-driven-wheel driving force.

Then, with the switching means shown in FIG. 16, in Step S116, the system makes comparison between the target total effective driving force according to the first and second control methods, and selects the control method corresponding to the greater target total effective driving force. With the present embodiment, the controller 4 includes the processing means shown in Steps S101 through S118, thereby enabling automatic switching of the control method wherein the system predicts driving of the vehicle beforehand, and automatically switches the control method so as to achieve great acceleration of the vehicle.

With the present embodiment, the maximum effective driving force computation means (S105) calculate the maximum effective driving force of the electric-motor-driven wheels corresponding to the last slippage data for a predetermined past period, obtained by the effective driving force history computation means (S101, S102) shown in FIG. 16, and thus, the system determines the target electric-motor torque Tetgt in a range of under the maximum effective electric-motor-driven-wheel driving force, in Step S9 in FIG. 9.

As described above, with the present embodiment, the system switches the driving state of the vehicle according to the intention of the user. However, in some cases, the second control method, wherein the system gives priority to the output of the electric motor, causes acceleration slipping of the front wheels, leading to a problem that steering of the front wheels generates small lateral force of the wheels, i.e., leading to a problem of so-called under-steering. Accordingly, an arrangement may be made wherein in the event that the steering sensor 3 serving as the steering amount detecting means shown in FIG. 1 detects the steering amount greater than a predetermined value during control processing according to the second control method, the system switches the selected control method to the first control method. With such a configuration, at the time of the user steering the vehicle so as to turn a corner while making acceleration, the vehicle generates yaw moment more quickly, thereby improving turning-round performance of the vehicle.

On the other hand, at the time of driving of the vehicle at a low speed, in many cases, the great yaw moment is not required. Accordingly, an arrangement may be made wherein the control method is switched giving consideration to the speed detected by the wheel-sensors mounted to the rear wheels. That is to say, an arrangement may be made wherein the system overrides to switch from the second control method to the first control method according to detection of steering in a case of the present vehicle speed exceeding the first vehicle-speed threshold (e.g., 8 km/h). With such a configuration, the vehicle maintains the great rear-wheel driving force at a low speed even in a case of the user steering the vehicle, thereby maintaining acceleration performance of the vehicle.

Furthermore, an arrangement may be made wherein in the event that the vehicle speed detected by the wheel-sensors mounted to the rear wheels exceeds a predetermined second vehicle-speed threshold, the system switches the selected control mode from the second control method to the first control mode. This improves fuel efficiency.

On the other hand, in general, the greater the rotational speed of the electric motor is, not only the smaller the torque thereof is, but also the efficiency thereof drops above a certain rotational speed. With the second control method, the system controls the engine output such that the output of the electric motor reaches the target value, and accordingly, driving of the electric motor with poor efficiency requires excessive engine output, leading to poor fuel efficiency. Accordingly, an arrangement may be made wherein the system detects the rotational speed of the electric motor using an unshown electric-motor rotational speed sensor, and in the event that the detected electric-motor rotational speed is equal to or greater than a predetermined value, the system switches the control method from the second control method to the first control method. Or, an arrangement may be made wherein in the event that the wheel speed detected by the wheel-speed detecting means is equal to or greater than a predetermined value (e.g., 30 km/h), the system switches the control method from the second control method to the first control method. Note that with such a configuration wherein the vehicle speed is used for determination of control-mode switching, while either wheel speed may be used as the vehicle speed, the speed of the rear wheels which are driven by the electric motor is more preferably used as the vehicle speed. With an arrangement according to the present embodiment including the differential gear 6, the system preferably uses the average of the left and right rear-wheel speeds so as to cancel the difference in wheel speed between the left and right wheels due to the differential gear 6, thereby further improving precision of the detected vehicle speed.

Note that while description has been made in the aforementioned embodiment regarding an arrangement wherein the controller 4 is included in a single casing, it is needless to say that an arrangement may be made wherein the engine control means and the electric-motor control means are included in separate casings, for example.

What is claimed is:

1. A control device for controlling a hybrid-four-wheel-driven vehicle wherein one of the front-wheel pair and the rear-wheel pair is an engine-driven-wheel pair which is driven by an engine, and the other pair is an electric-motor-driven-wheel pair which is driven by an electric motor connected to a generator driven by said engine, said control device comprising:
   slipping detecting means for detecting slipping of said engine-driven wheels; and
   output control means for increasing the output of said engine corresponding to the increased output of said electric motor,
   wherein said slipping detecting means detects slipping in the event that the speed of said engine-driven wheels exceeds the driving speed of the vehicle.

2. A control device for controlling a hybrid-four-wheel-driven vehicle wherein one of the front-wheel pair and the rear-wheel pair is an engine-driven-wheel pair which is driven by an engine, and the other pair is an electric-motor-driven-wheel pair which is driven by an electric motor connected to a generator driven by said engine, said control device comprising:
   slipping detecting means for detecting slipping of said engine-driven wheels; and
   output control means for increasing the output of said engine corresponding to the increased output of said electric motor,
   wherein said slipping detecting means detects slipping in the event that the slippage, which is the difference in rotational speed between said engine-driven wheels and said electric-motor-driven wheels, divided by the driving speed of the vehicle, is equal to or greater than a predetermined value.

3. A control device for controlling a hybrid-four-wheel-driven vehicle wherein one of the front-wheel pair and the rear-wheel pair is an engine-driven-wheel pair which is driven by an engine, and the other pair is an electric-motor-driven-wheel pair which is driven by an electric motor connected to a generator driven by said engine, said control device comprising:
   slipping detecting means for detecting slipping of said engine-driven wheels; and
   output control means for increasing the output of said engine corresponding to the increased output of said electric motor,
   wherein said output control means further comprises:
      means for computing the present electric-motor output based upon an input current and a field-coil current of said electric motor;
      means for computing target acceleration driving force corresponding to an input acceleration request;
      means for obtaining target electric-motor output based upon said present electric-motor output and said target acceleration driving force;
      means for obtaining target engine output required for achieving said target electric-motor output; and
      means for controlling output of said engine and output of said electric motor according to said target engine output and said target electric-motor output.

4. A control device for controlling a hybrid-four-wheel-driven vehicle wherein one of the front-wheel pair and the rear-wheel pair is an engine-driven-wheel pair which is driven by an engine, and the other pair is an electric-motor-driven-wheel pair which is driven by an electric motor connected to a generator driven by said engine, said control device comprising:
   slipping detecting means for detecting slipping of said engine-driven wheels; and
   output control means for increasing the output of said engine corresponding to the increased output of said electric motor,
   wherein said output control means further comprises:
      effective-driving-force history computation means for obtaining history data of the effective driving force of said electric-motor driving wheels corresponding to the last slippage data for a predetermined past period; and
      maximum-effective-driving-force computation means for computing the maximum value of the effective driving force of said electric-motor-driven wheels based upon said history data, wherein the output of said electric motor is increased in a range determined by the maximum value of the effective driving force of said electric-motor-driven wheels.

* * * * *